US011632787B2

(12) United States Patent
Xu et al.

(10) Patent No.: US 11,632,787 B2
(45) Date of Patent: Apr. 18, 2023

(54) BANDWIDTH PART INDICATION FOR MULTIPLE CELLS SCHEDULED BY A SINGLE DOWNLINK CONTROL INFORMATION MESSAGE

(71) Applicant: QUALCOMM Incorporated, San Diego, CA (US)

(72) Inventors: Huilin Xu, San Diego, CA (US); Xiaoxia Zhang, San Diego, CA (US); Kazuki Takeda, Tokyo (JP); Mostafa Khoshnevisan, San Diego, CA (US); Wanshi Chen, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/108,684

(22) Filed: Dec. 1, 2020

(65) Prior Publication Data
US 2021/0258996 A1    Aug. 19, 2021

Related U.S. Application Data

(60) Provisional application No. 62/975,857, filed on Feb. 13, 2020.

(51) Int. Cl.
*H04W 72/23*     (2023.01)
*H04W 16/32*     (2009.01)

(52) U.S. Cl.
CPC ........... *H04W 72/23* (2023.01); *H04W 16/32* (2013.01)

(58) Field of Classification Search
None
See application file for complete search history.

(56) References Cited

U.S. PATENT DOCUMENTS

| 2019/0141734 | A1 | 5/2019 | Lei et al. | |
| 2020/0119896 | A1 | 4/2020 | Li et al. | |
| 2021/0144743 | A1* | 5/2021 | Rastegardoost | .. H04W 72/1257 |
| 2022/0078803 | A1* | 3/2022 | Yang | ...................... H04L 5/001 |
| 2022/0377583 | A1* | 11/2022 | Wang | ................ H04W 52/0206 |

FOREIGN PATENT DOCUMENTS

| WO | WO-2016123393 A1 * | 8/2016 | ............. H04L 5/001 |
| WO | 2018228416 A1 | 12/2018 | |
| WO | 2019213870 A1 | 11/2019 | |
| WO | WO-2021140672 A1 * | 7/2021 | |

OTHER PUBLICATIONS

International Search Report and Written Opinion—PCT/US2020/062927—ISA/EPO—dated Mar. 17, 2021.

* cited by examiner

Primary Examiner — Jenkey Van
(74) Attorney, Agent, or Firm — Harrity & Harrity, LLP

(57) ABSTRACT

Various aspects of the present disclosure generally relate to wireless communication. In some aspects, a user equipment may receive a single downlink control information (DCI) message that schedules communications on multiple cells, wherein the single DCI message indicates multiple bandwidth parts, corresponding to the multiple cells, on which the communications are scheduled; and communicate using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells. Numerous other aspects are provided.

33 Claims, 13 Drawing Sheets

BANDWIDTH PART INDICATION FOR MULTIPLE CELLS SCHEDULED BY A SINGLE DOWNLINK CONTROL INFORMATION MESSAGE

CROSS-REFERENCE TO RELATED APPLICATION

This patent application claims priority to Provisional Patent Application No. 62/975,857, filed on Feb. 13, 2020, entitled "BANDWIDTH PART INDICATION FOR MULTIPLE CELLS SCHEDULED BY A SINGLE DOWNLINK CONTROL INFORMATION MESSAGE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for bandwidth part indication for multiple cells scheduled by a single downlink control information message.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a single downlink control information (DCI) message that schedules communications on multiple cells, wherein the single DCI message indicates multiple bandwidth parts, corresponding to the multiple cells, on which the communications are scheduled; and communicating using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

In some aspects, the communications are downlink communications, the multiple bandwidth parts are multiple downlink bandwidth parts, and the communicating comprises receiving the downlink communications in the multiple downlink bandwidth parts corresponding to the multiple cells.

In some aspects, the communications are uplink communications, the multiple bandwidth parts are multiple uplink bandwidth parts, and the communicating comprises transmitting the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the UE is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the UE is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the method further comprises receiving a configuration that indicates at least one of: a number of bits included in the single bandwidth part indicator field, a mapping between a set of single bandwidth part indicator values and a corresponding set of multiple values used to identify the multiple bandwidth parts, or a combination thereof.

In some aspects, a method of wireless communication, performed by a base station, may include transmitting a single DCI message that schedules communications on multiple cells, wherein the single DCI message indicates multiple bandwidth parts, corresponding to the multiple cells, on which the communications are scheduled; and communicating using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

In some aspects, the communications are downlink communications, the multiple bandwidth parts are multiple downlink bandwidth parts, and the communicating comprises transmitting the downlink communications in the multiple downlink bandwidth parts corresponding to the multiple cells.

In some aspects, the communications are uplink communications, the multiple bandwidth parts are multiple uplink bandwidth parts, and the communicating comprises receiving the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the base station is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the base station is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the method further comprises transmitting a configuration that indicates at least one of: a number of bits included in the single bandwidth part indicator field, a mapping between a set of single bandwidth part indicator values and a corresponding set of multiple values used to identify the multiple bandwidth parts, or a combination thereof.

In some aspects, a UE for wireless communication may include memory and one or more processors operatively coupled to the memory. The memory and the one or more processors may be configured to receive a single DCI message that schedules communications on multiple cells, wherein the single DCI message indicates multiple bandwidth parts, corresponding to the multiple cells, on which the communications are scheduled; and communicate using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

In some aspects, the communications are downlink communications, the multiple bandwidth parts are multiple downlink bandwidth parts, and the communicating comprises receiving the downlink communications in the multiple downlink bandwidth parts corresponding to the multiple cells.

In some aspects, the communications are uplink communications, the multiple bandwidth parts are multiple uplink bandwidth parts, and the communicating comprises transmitting the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the UE is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the UE is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the UE is configured to receive a configuration that indicates at least one of: a number of bits included in the single bandwidth part indicator field, a mapping between a set of single bandwidth part indicator values and a corresponding set of multiple values used to identify the multiple bandwidth parts, or a combination thereof.

In some aspects, a base station for wireless communication may include memory and one or more processors operatively coupled to the memory. The memory and the one or more processors may be configured to transmit a single DCI message that schedules communications on multiple cells, wherein the single DCI message indicates multiple bandwidth parts, corresponding to the multiple cells, on which the communications are scheduled; and communicate using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

In some aspects, the communications are downlink communications, the multiple bandwidth parts are multiple downlink bandwidth parts, and the communicating comprises transmitting the downlink communications in the multiple downlink bandwidth parts corresponding to the multiple cells.

In some aspects, the communications are uplink communications, the multiple bandwidth parts are multiple uplink bandwidth parts, and the communicating comprises receiving the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the base station is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the base station is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the base station is configured to transmit a configuration that indicates at least one of: a number of bits included in the single bandwidth part indicator field, a mapping between a set of single bandwidth part indicator values and a corresponding set of multiple values used to identify the multiple bandwidth parts, or a combination thereof.

In some aspects, a non-transitory computer-readable medium may store one or more instructions for wireless communication. The one or more instructions, when executed by one or more processors of a UE, may cause the one or more processors to: receive a single DCI message that schedules communications on multiple cells, wherein the single DCI message indicates multiple bandwidth parts, corresponding to the multiple cells, on which the communications are scheduled; and communicate using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

In some aspects, the communications are downlink communications, the multiple bandwidth parts are multiple downlink bandwidth parts, and the communicating comprises receiving the downlink communications in the multiple downlink bandwidth parts corresponding to the multiple cells.

In some aspects, the communications are uplink communications, the multiple bandwidth parts are multiple uplink bandwidth parts, and the communicating comprises transmitting the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the UE is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the UE is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the one or more instructions further cause the UE to receive a configuration that indicates at least one of: a number of bits included in the single bandwidth part indicator field, a mapping between a set of single bandwidth part indicator values and a corresponding set of multiple values used to identify the multiple bandwidth parts, or a combination thereof.

In some aspects, a non-transitory computer-readable medium may store one or more instructions for wireless communication. The one or more instructions, when executed by one or more processors of a base station, may cause the one or more processors to: transmit a single DCI message that schedules communications on multiple cells, wherein the single DCI message indicates multiple bandwidth parts, corresponding to the multiple cells, on which the communications are scheduled; and communicate using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

In some aspects, the communications are downlink communications, the multiple bandwidth parts are multiple downlink bandwidth parts, and the communicating comprises transmitting the downlink communications in the multiple downlink bandwidth parts corresponding to the multiple cells.

In some aspects, the communications are uplink communications, the multiple bandwidth parts are multiple uplink bandwidth parts, and the communicating comprises receiving the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the base station is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the base station is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the one or more instructions further cause the base station to transmit a configuration that indicates at least one of: a number of bits included in the single bandwidth part indicator field, a mapping between a set of single bandwidth part indicator values and a corresponding set of multiple values used to identify the multiple bandwidth parts, or a combination thereof.

In some aspects, an apparatus for wireless communication may include means for receiving a single DCI message that schedules communications on multiple cells, wherein the single DCI message indicates multiple bandwidth parts, corresponding to the multiple cells, on which the communications are scheduled; and means for communicating using the multiple bandwidth parts corresponding to the multiple cells, wherein the means for communicating comprises: means for transmitting the communications in the multiple bandwidth parts corresponding to the multiple cells, and/or means for receiving the communications in the multiple bandwidth parts corresponding to the multiple cells.

In some aspects, the communications are downlink communications, the multiple bandwidth parts are multiple downlink bandwidth parts, and the communicating comprises receiving the downlink communications in the multiple downlink bandwidth parts corresponding to the multiple cells.

In some aspects, the communications are uplink communications, the multiple bandwidth parts are multiple uplink bandwidth parts, and the communicating comprises transmitting the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the UE is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the UE is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the UE is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the apparatus includes means for receiving a configuration that indicates at least one of: a number of bits included in the single bandwidth part indicator field, a mapping between a set of single bandwidth part indicator values and a corresponding set of multiple values used to identify the multiple bandwidth parts, or a combination thereof.

In some aspects, an apparatus for wireless communication may include means for transmitting a single DCI message that schedules communications on multiple cells, wherein the single DCI message indicates multiple bandwidth parts, corresponding to the multiple cells, on which the communications are scheduled; and means for communicating using the multiple bandwidth parts corresponding to the multiple cells, wherein the means for communicating comprises: means for transmitting the communications in the multiple bandwidth parts corresponding to the multiple cells, and/or means for receiving the communications in the multiple bandwidth parts corresponding to the multiple cells.

In some aspects, the communications are downlink communications, the multiple bandwidth parts are multiple downlink bandwidth parts, and the communicating comprises transmitting the downlink communications in the multiple downlink bandwidth parts corresponding to the multiple cells.

In some aspects, the communications are uplink communications, the multiple bandwidth parts are multiple uplink bandwidth parts, and the communicating comprises receiving the uplink communications in the multiple uplink bandwidth parts corresponding to the multiple cells.

In some aspects, the single DCI message includes a single bandwidth part indicator value within a single bandwidth part indicator field, wherein the single bandwidth part indicator value represents a single value that is used to identify the multiple bandwidth parts for all of the multiple cells.

In some aspects, the single bandwidth part indicator value indicates a first bandwidth part on a first cell, of the multiple cells, and a second bandwidth part on a second cell of the multiple cells.

In some aspects, a number of bits included in the single bandwidth part indicator field is based at least in part on a number of bandwidth parts configured for a cell of the multiple cells, wherein all cells of the multiple cells are configured with a same number of bandwidth parts.

In some aspects, a number of bits included in the single bandwidth part indicator field is based at least in part on a maximum number of bandwidth parts permitted to be configured for a cell of the multiple cells.

In some aspects, a number of bits included in the single bandwidth part indicator field is based at least in part on a smallest number of bandwidth parts configured for a cell, of the multiple cells, as compared to all other cells of the multiple cells.

In some aspects, a number of bits included in the single bandwidth part indicator field is based at least in part on a largest number of bandwidth parts configured for a cell, of the multiple cells, as compared to all other cells of the multiple cells.

In some aspects, a number of bits included in the single bandwidth part indicator field is based at least in part on a number of bandwidth parts configured for a specific cell.

In some aspects, the specific cell is: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

In some aspects, the single bandwidth part indicator value corresponds to a bandwidth part number that is greater than a number of bandwidth parts configured for a cell of the multiple cells.

In some aspects, the base station is configured to refrain from scheduling a communication, of the scheduled communications, in the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In some aspects, the base station is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

In some aspects, the base station is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In some aspects, the specific bandwidth part is a bandwidth part with a smallest identifier among the number of bandwidth parts configured for the cell or a bandwidth part with a largest identifier among the number of bandwidth parts configured for the cell.

In some aspects, the single DCI message includes multiple bandwidth part indicator values in corresponding multiple bandwidth part indicator fields, wherein each bandwidth part indicator value corresponds to a different cell of the multiple cells.

In some aspects, a number of cells, included in the multiple cells, is less than or equal to a threshold.

In some aspects, the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

In some aspects, the apparatus includes means for transmitting a configuration that indicates at least one of: a number of bits included in the single bandwidth part indicator field, a mapping between a set of single bandwidth part indicator values and a corresponding set of multiple values used to identify the multiple bandwidth parts, or a combination thereof.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
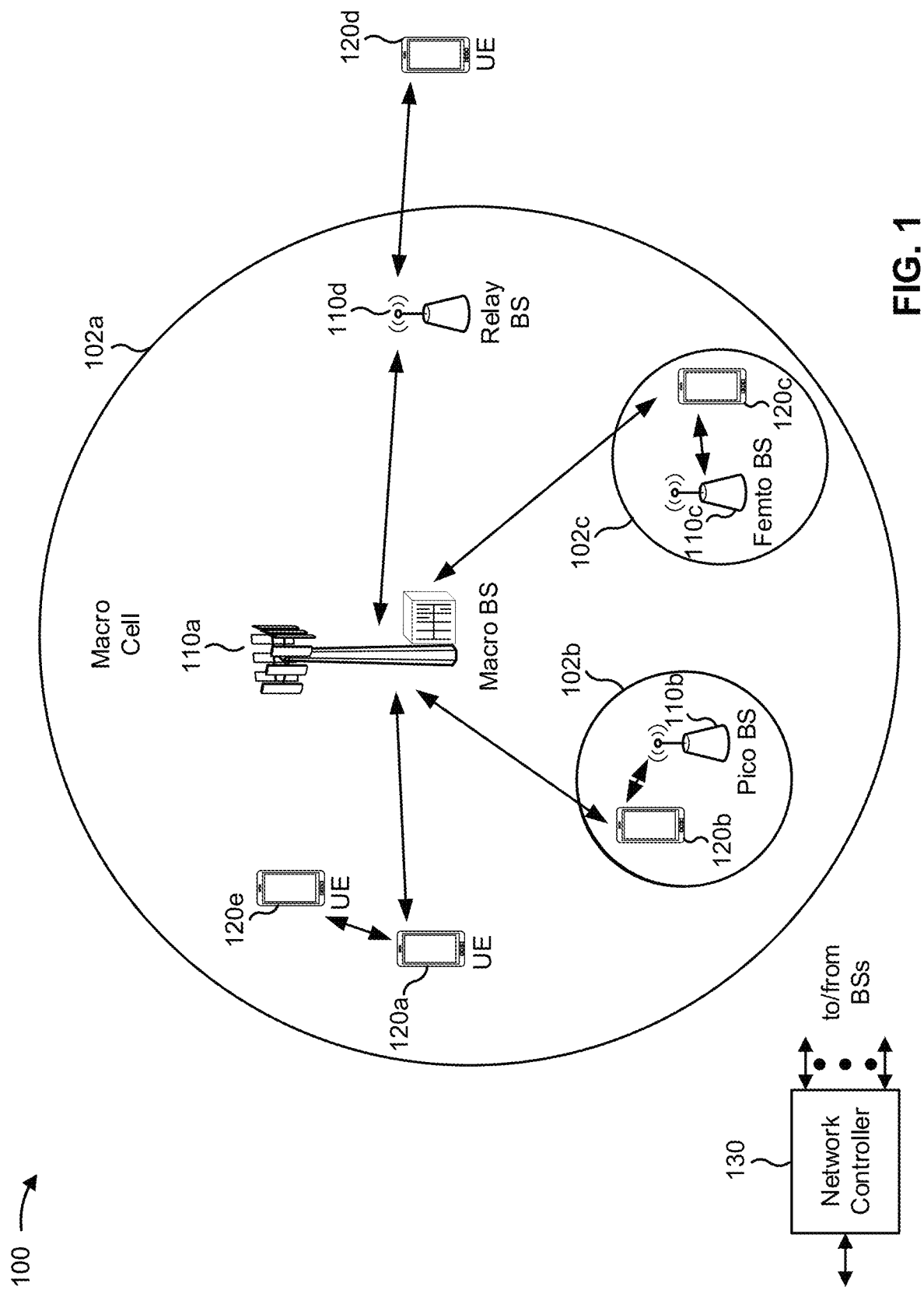
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
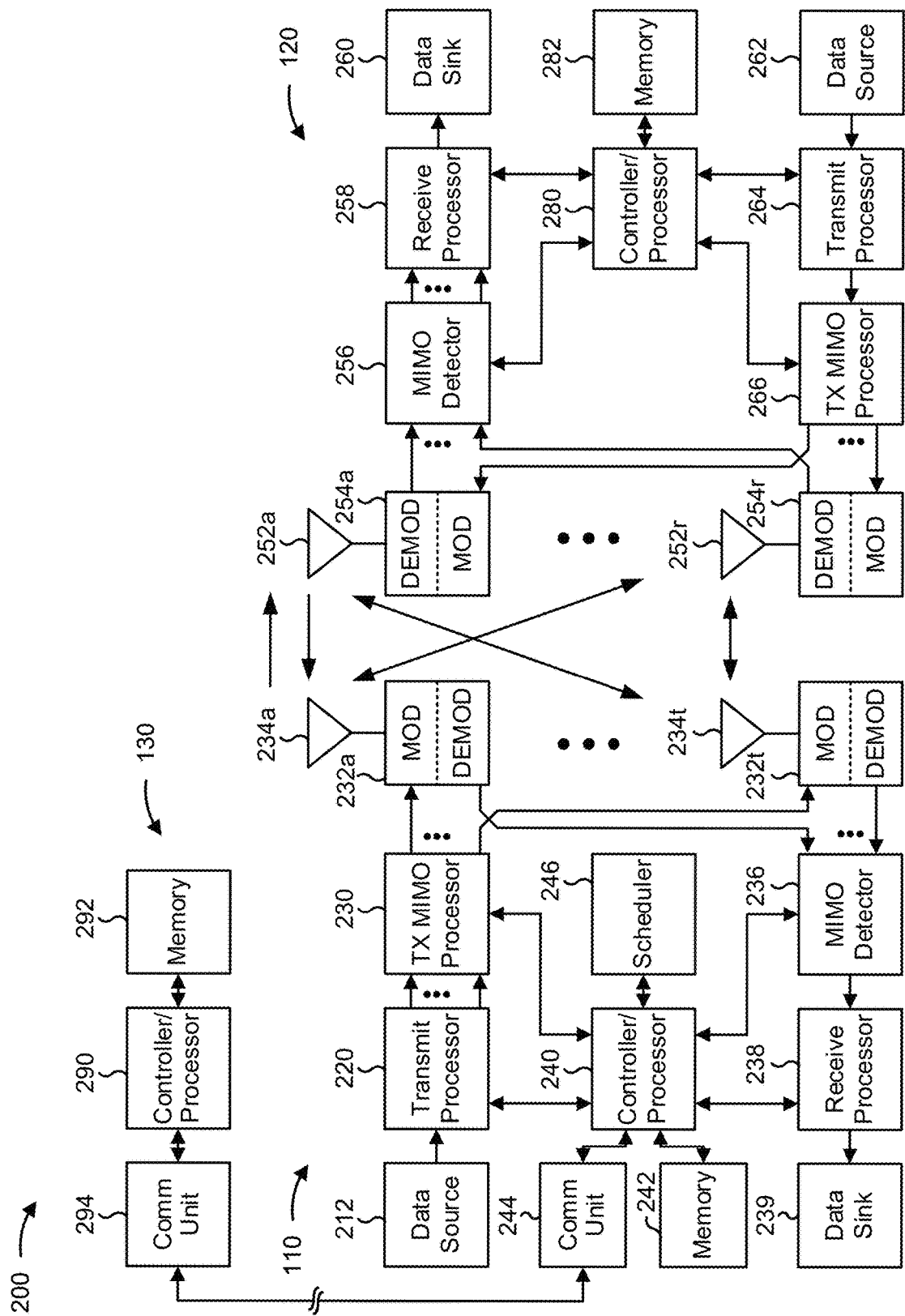
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with bandwidth part indication for multiple cells scheduled by a single downlink control information (DCI) message, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1200 of FIG. 12, process 1300 of FIG. 13, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a single DCI message that schedules communications on multiple cells, wherein the single DCI message indicates multiple bandwidth parts, corresponding to the multiple cells, on which the communications are scheduled; means for communicating using the multiple bandwidth parts corresponding to the multiple cells, wherein the means for communicating comprises: means for transmitting the communications in the multiple bandwidth parts corresponding to the multiple cells, and/or means for receiving the communications in the multiple bandwidth parts corresponding to the multiple cells; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a single DCI message that schedules communications on multiple cells, wherein the single DCI message indicates multiple bandwidth parts, corresponding to the multiple cells, on which the communications are scheduled; means for communicating using the multiple bandwidth parts corresponding to the multiple cells, wherein the means for communicating comprises: means for transmitting the communications in the multiple bandwidth parts corresponding to the multiple cells, and/or means for receiving the communications in the multiple bandwidth parts corresponding to the multiple cells; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

FIGS. 3-6 are diagrams illustrating example bandwidth parts, in accordance with various aspects of the present disclosure.

New Radio (NR) supports the use of multiple different numerologies (e.g., subcarrier spacing options of 15 kHz, 30 kHz, 60 kHz, 120 kHz, and/or the like) and multiple different slot durations (e.g., 0.5 ms, 0.25 ms, 0.125 ms, and/or the like). Furthermore, a wideband bandwidth (e.g., a system bandwidth and/or the like) in NR may be up to 100 MHz (e.g., for the sub-6 GHz frequency band), up to 400 MHz (e.g., for a frequency band above 6 GHz), and/or the like. In some cases, there may be scenarios where a UE only monitors or is only served with a subset of the wideband bandwidth. This subset may be referred to as a bandwidth part, and may be limited for reduced power consumption, for flexible bandwidth allocation, due to a UE capability, due to a UE being in a power saving mode, and/or the like.

Figure 3:
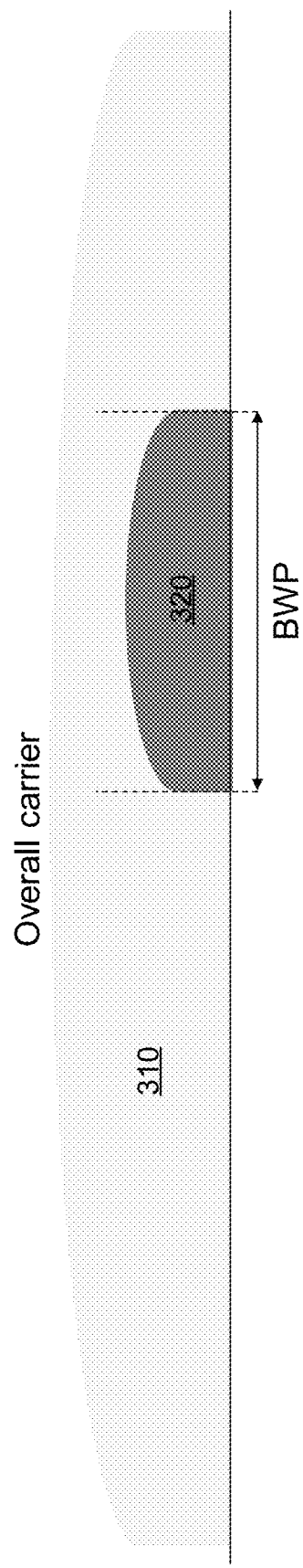
FIGS. 3-6 are diagrams illustrating example bandwidth parts, in accordance with various aspects of the present disclosure.

For example, as shown in FIG. 3, an overall carrier 310 may span a wideband bandwidth, and a bandwidth part (BWP) 320 may span a portion of the overall carrier 310. For example, the BWP 320 may have a smaller or narrower bandwidth than the overall carrier 310 due to a UE capability, such as a reduced UE bandwidth capability. As a more specific example, the UE may be an NB-IoT UE with a limited bandwidth capability. Additionally, or alternatively, the BWP 320 may have a smaller bandwidth than the overall carrier 310 to achieve reduced power consumption, to enable flexible bandwidth allocation (e.g., on a particular cell or carrier or across cells or carriers), and/or the like.

Figure 4:
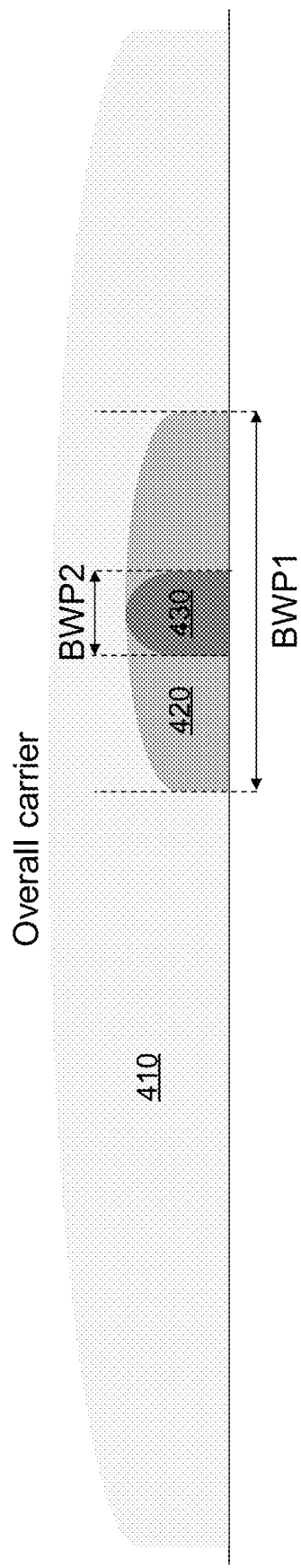

As another example, and as shown in FIG. 4, an overall carrier 410 may span a wideband bandwidth, a first bandwidth part (shown as BWP1) 420 may span a portion of the overall carrier 410, and a second bandwidth part (shown as BWP2) 430 may span a portion of the first bandwidth part. In this case, the first bandwidth part 420 may represent a UE bandwidth capability, and the second bandwidth part 430 may represent a bandwidth to be monitored by or served to the UE. For example, the UE may be capable of communicating over the entire first bandwidth part 420, but may be configured to communicate only in the second bandwidth part 430 (e.g., for a time period) to conserve battery power. In this case, the UE may be capable of transitioning between a full bandwidth configuration, where the UE monitors or is served on the first bandwidth part 420, and a bandwidth part configuration where the UE monitors or is served on the second bandwidth part 430. For example, the UE may transition to the full bandwidth configuration when the UE is scheduled to transmit or receive data (e.g., a threshold amount of data), and may transition to the bandwidth part configuration to conserve battery power when the UE is not scheduled to transmit or receive data.

Figure 5:
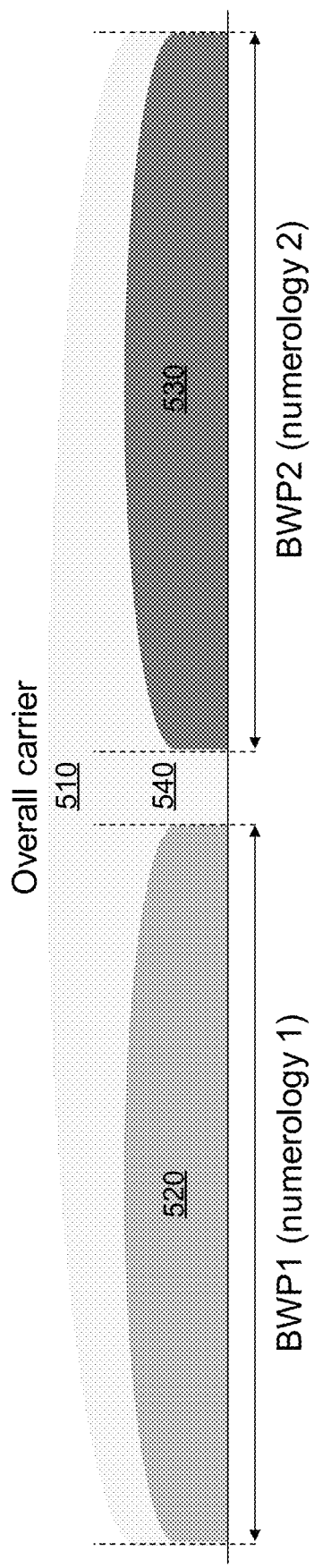

As another example, and as shown in FIG. 5, an overall carrier 510 may span a wideband bandwidth, which may be partitioned into multiple bandwidth parts, such as a first bandwidth part (shown as BWP1) 520 and a second bandwidth part (shown as BWP2) 530. The bandwidth parts 520, 530 may each span a portion of the overall carrier 510. In some aspects, different bandwidth parts may be associated with different numerologies, such as 15 kHz, 30 kHz, 60 kHz, 120 kHz, and/or the like. Additionally, or alternatively, a guard band 540 (e.g., a gap) may be configured between different bandwidth parts to reduce interference between bandwidth parts and/or numerologies.

Figure 6:
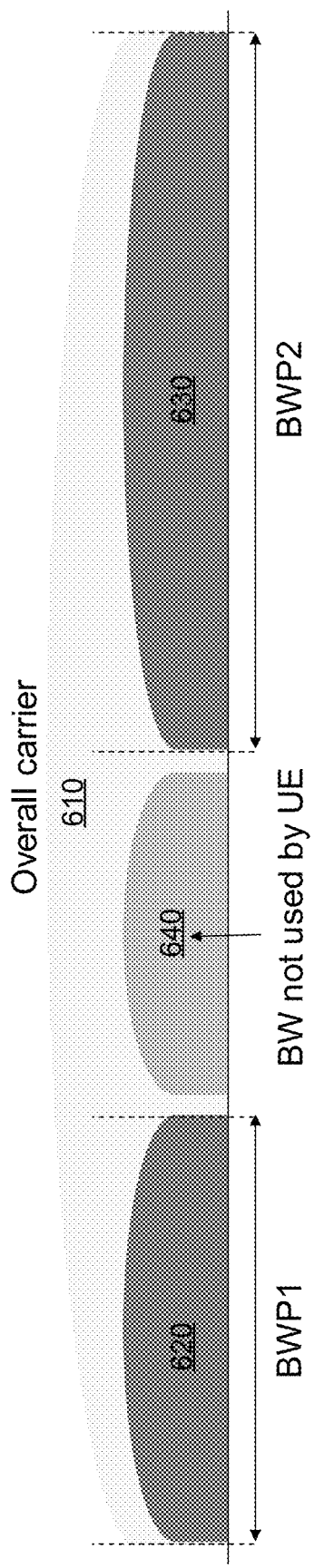

As another example, and as shown in FIG. 6, an overall carrier 610 may span a wideband bandwidth, which may be partitioned into multiple bandwidth parts, such as a first bandwidth part (shown as BWP1) 620 and a second bandwidth part (shown as BWP2) 630. Further, the overall carrier 610 may include a third bandwidth part 640 not used by the UE. For example, the first bandwidth part 620 and the second bandwidth part 630 may be associated with the same network operator, and/or may be used to support intra-band carrier aggregation, while the third bandwidth part 640 may be associated with a different network operator and/or may not be used for carrier aggregation. In some implementations, a synchronization signal (SS) block (e.g., which includes one or more of a PSS, an SSS, a physical broadcast channel (PBCH), and/or the like) may be transmitted on one bandwidth part, and may include information for multiple bandwidth parts to conserve network resources.

As indicated above, FIGS. 3-6 are provided as examples. Other examples may differ from what was described in connection with FIGS. 3-6.

Figure 7:
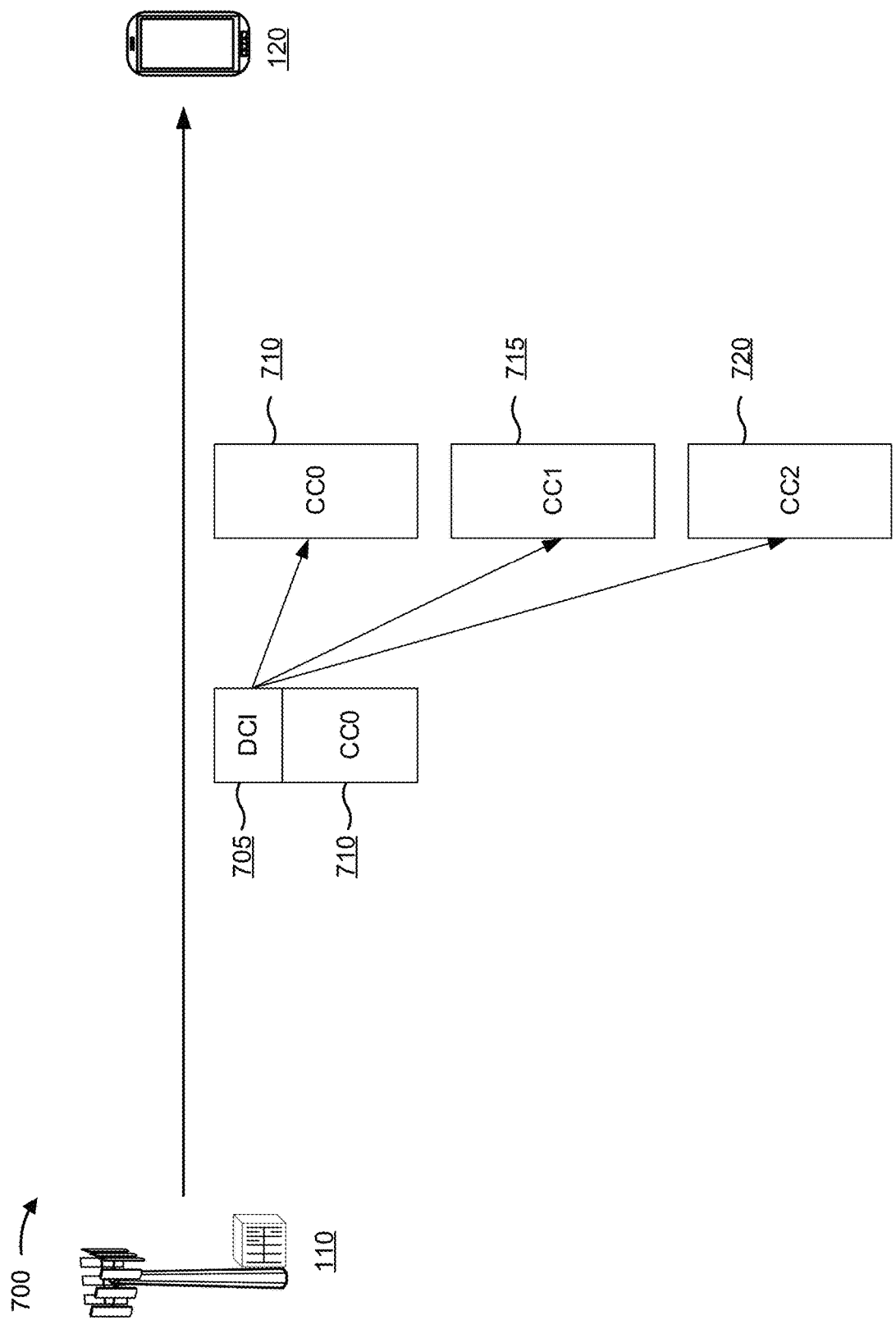
FIG. 7 is a diagram illustrating an example of downlink control information (DCI) that schedules multiple cells, in accordance with various aspects of the present disclosure.

FIG. 7 is a diagram illustrating an example 700 of downlink control information (DCI) (e.g., a single DCI message) that schedules multiple cells, in accordance with various aspects of the present disclosure. As shown in FIG. 7, a base station 110 and a UE 120 may communicate with one another.

As shown, the base station 110 may transmit, to the UE 120, DCI 705 (e.g., a single DCI message) that schedules multiple communications for the UE 120. The multiple communications may be scheduled for at least two different cells. In some cases, a cell may be referred to as a carrier or a component carrier (CC). In some cases, DCI that schedules a communication for a cell via which the DCI is transmitted may be referred to as self-carrier (or self-cell) scheduling DCI. In some cases, DCI that schedules a communication for a cell via which the DCI is transmitted may be referred to as cross-carrier (or cross-cell) scheduling DCI. In some aspects, the DCI 705 may be cross-carrier scheduling DCI, and may or may not be self-carrier scheduling DCI. In some aspects, the DCI 705 that schedules communications in at least two cells may be referred to as combination DCI, a single DCI message that schedules communications on multiple cells, and/or the like.

In example 700, the DCI 705 schedules a communication for a first cell 710 that carries the DCI 705 (shown as CC0), schedules a communication for a second cell 715 that does not carry the DCI 705 (shown as CC1), and schedules a communication for a third cell 720 that does not carry the DCI 705 (shown as CC2). In some aspects, the DCI 705 may schedule communications on a different number of cells than shown in FIG. 7 (e.g., two cells, four cells, five cells, and so on). The number of cells may be greater than or equal to two.

A communication scheduled by the DCI 705 may include a data communication, such as a physical downlink shared channel (PDSCH) communication, a physical uplink shared channel (PUSCH) communication, and/or the like. For a data communication, the DCI 705 may schedule a single transport block (TB) across multiple cells or may separately schedule multiple TBs in the multiple cells. Additionally, or alternatively, a communication scheduled by the DCI 705 may include a reference signal, such as a channel state information reference signal (CSI-RS), a sounding reference signal (SRS), and/or the like. For a reference signal, the DCI 705 may trigger a single resource for reference signal transmission across multiple cells or may separately schedule multiple resources for reference signal transmission in the multiple cells. In some cases, scheduling information in the DCI 705 may be indicated once and reused for multiple communications (e.g., on different cells), such as a modulation and coding scheme (MCS), a resource to be used for acknowledgement (ACK) or negative acknowledgement (NACK) of a communication scheduled by the DCI 705, a resource allocation for a scheduled communication, and/or the like, to conserve signaling overhead.

In some aspects, the base station 110 may configure a cell with multiple bandwidth parts (BWPs), as described above in connection with FIGS. 3-6. In this case, when the base station 110 transmits DCI to the UE 120 to schedule a communication (e.g., an uplink communication or a downlink communication), the base station 110 may include, in the DCI (e.g. in a BWP indicator field of the DCI), an indication of a BWP on which the communication is scheduled. The UE 120 may then transmit or receive (e.g., monitor for) the communication in the indicated BWP on the cell. For example, if a BWP indicator field in DCI indicates a BWP that is not the current active BWP for the cell (e.g., the BWP being used by the UE 120 to communicate on the cell), then the UE 120 may switch to the indicated BWP, which then becomes the active BWP, to transmit or receive the scheduled communication.

However, when a single DCI message schedules communications on multiple cells, as shown in FIG. 7, each cell may have a different set of configured BWPs. In this case, the UE 120 may misinterpret a BWP indication included in the single DCI message, and may select a BWP that was not intended by the base station 110. This may lead to errors and dropped communications, may increase latency, may reduce reliability, may reduce spectral efficiency (e.g., due to retransmissions), and/or the like.

Some techniques and apparatuses described herein enable a UE 120 to properly interpret a BWP indication included in a single DCI message that schedules communication in multiple cells, and to apply that BWP indication to determine a respective BWP on each of the multiple cells. In this way, communication errors may be reduced, latency may be reduced, reliability may be improved, spectral efficiency may be improved, and/or the like. Furthermore, some techniques and apparatuses described herein enable a single BWP indication to be applied across multiple cells, thereby reducing signaling overhead.

As indicated above, FIG. 7 is provided as an example. Other examples may differ from what is described with respect to FIG. 7.

Figure 8:
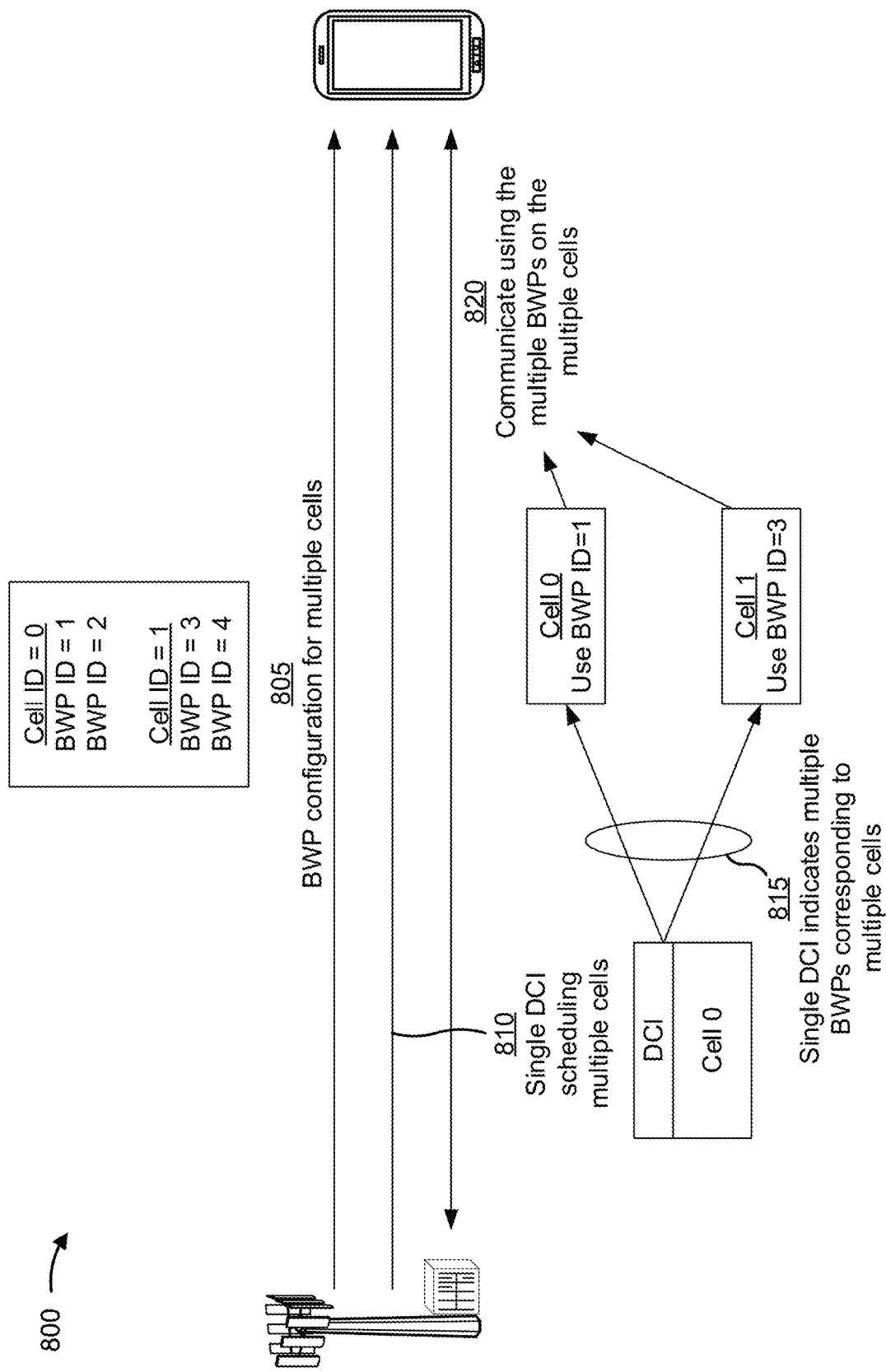
FIGS. 8-11 are diagrams illustrating examples of bandwidth part indication for multiple cells scheduled by a single DCI message, in accordance with various aspects of the present disclosure.

FIG. 8 is a diagram illustrating an example 800 of BWP indication for multiple cells scheduled by a single DCI message, in accordance with various aspects of the present disclosure. As shown in FIG. 8, a base station 110 and a UE 120 may communicate with one another.

As shown by reference number 805, the base station 110 may transmit, to the UE 120, a BWP configuration for multiple cells. For example, the base station 110 may configure one or more BWPs for each cell that is configured for the UE 120. A BWP may be identified using a BWP identifier (shown as BWP ID). Similarly, a cell may be identified using a cell identifier (shown as cell ID). In example 800, the base station 110 configures a first BWP, having a BWP ID of 1, and a second BWP, having a BWP ID of 2, for a first cell having a cell ID of 0. The base station 110 also configures a third BWP, having a BWP ID of 3, and a fourth BWP, having a BWP ID of 4, for a second cell having a cell ID of 1. In some aspects, the base station 110 may configure, for each cell configured for the UE 120, one or more uplink BWPs for uplink communications on that cell and/or one or more downlink BWPs for downlink communication on that cell. In some aspects, the BWP configuration may be included in a configuration message, such as a radio resource control (RRC) message (e.g., an RRC configuration message, an RRC reconfiguration message, and/or the like).

As shown by reference number 810, the base station 110 may transmit, to the UE 120, a single DCI message that schedules communications on multiple cells, as described in more detail above in connection with FIG. 7. As shown by reference number 815, the single DCI message may indicate multiple BWPs, corresponding to the multiple cells, on which the communications are scheduled. In example 800, the single DCI message indicates that a first communication is scheduled on the first BWP (having a BWP ID of 1) of the first cell (Cell 0), and that a second communication is scheduled on the third BWP (having a BWP ID of 3) of the second cell (Cell 1). Additional details regarding techniques for indicating the multiple BWPs are described below in connection with FIGS. 9-11.

As shown by reference number 820, the UE 120 and the base station 110 may communicate with one another using the multiple BWPs (indicated in the single DCI message) corresponding to the multiple cells. For example, the base station 110 may transmit downlink communications to the UE 120 using the multiple BWPs corresponding to the multiple cells, and the UE 120 may monitor for and/or receive the downlink communications using the multiple BWPs corresponding to the multiple cells. Alternatively, the UE 120 may transmit uplink communications to the base station 110 using the multiple BWPs corresponding to the multiple cells, and the base station 110 may monitor for and/or receive the uplink communications using the multiple BWPs corresponding to the multiple cells.

For example, if the single DCI message includes downlink grants that schedule downlink communications on multiple cells, then the single DCI message may indicate multiple downlink BWPs corresponding to the multiple cells. In some aspects, the base station 110 may configure multiple downlink BWPs for each cell configured for the UE 120, as described above. In this case, the single DCI message may indicate a downlink BWP for each cell on which a downlink communication is scheduled by the single DCI message. The base station 110 may transmit the downlink communications on the indicated downlink BWPs for respective cells, and the UE 120 may monitor for and/or receive the downlink communications on the indicated downlink BWPs for respective cells.

As another example, if the single DCI message includes uplink grants that schedule uplink communications on multiple cells, then the single DCI message may indicate multiple uplink BWPs corresponding to the multiple cells. In some aspects, the base station 110 may configure multiple uplink BWPs for each cell configured for the UE 120, as described above. In this case, the single DCI message may indicate an uplink BWP for each cell on which an uplink communication is scheduled by the single DCI message. The UE 120 may transmit the uplink communications on the indicated uplink BWPs for respective cells, and the base station 110 may monitor for and/or receive the uplink communications on the indicated uplink BWPs for respective cells.

By enabling indication of multiple BWPs, corresponding to multiple cells, in the single DCI message, communication errors may be reduced, latency may be reduced, reliability may be improved, spectral efficiency may be improved, and/or the like. Furthermore, signaling overhead may be reduced according to some techniques described herein. Additional details regarding techniques for indicating the multiple BWPs are described below in connection with FIGS. 9-11. In some aspects, a first technique described below may be used to indicate multiple BWPs for downlink communications, and a second (e.g., different) technique described below may be used to indicate multiple BWPs for uplink communications. In some aspects, the same technique may be used to indicate multiple BWPs for both downlink communications and uplink communications.

As indicated above, FIG. 8 is provided as an example. Other examples may differ from what is described with respect to FIG. 8.

Figure 9:
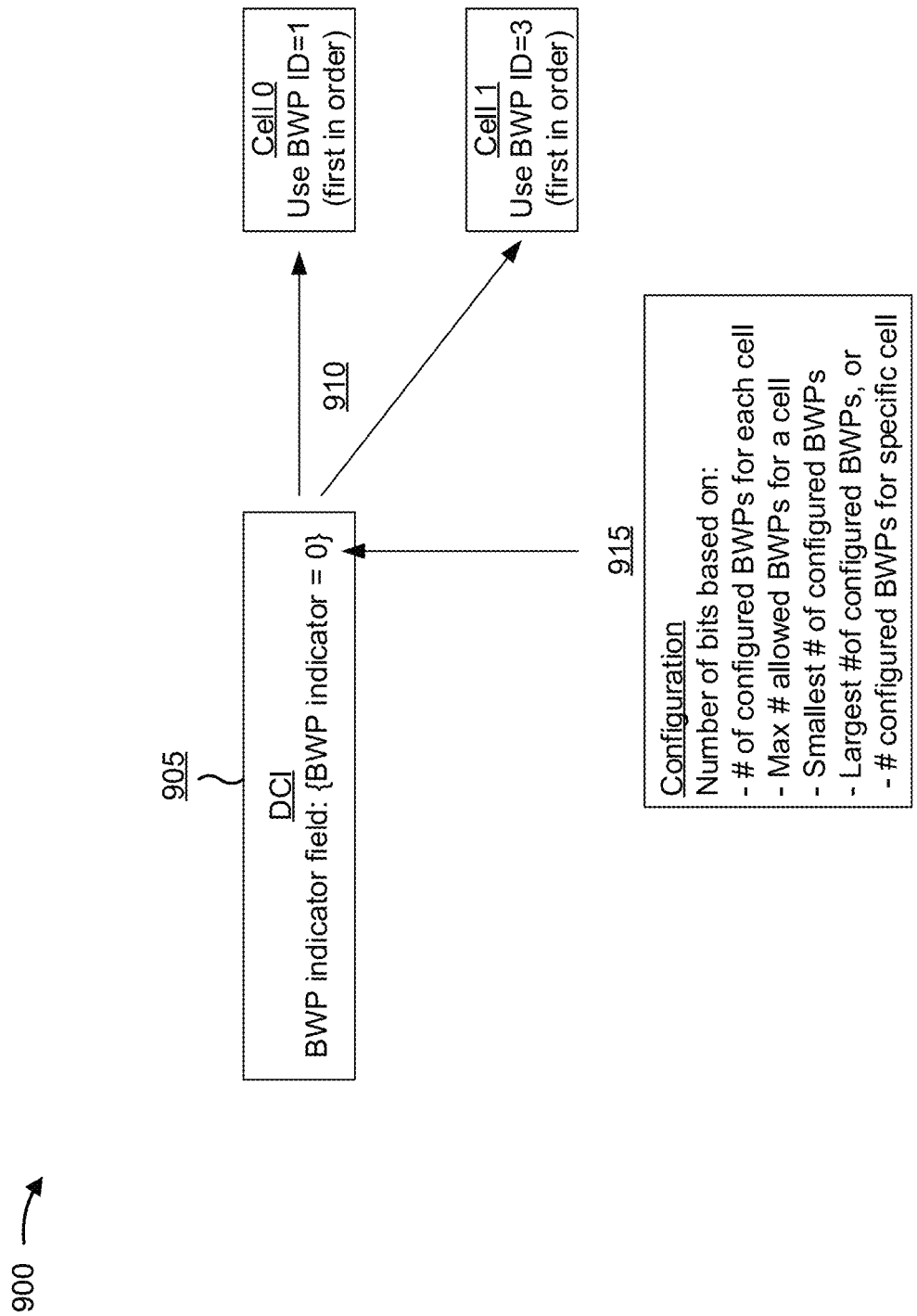

FIG. 9 is a diagram illustrating an example 900 of BWP indication for multiple cells scheduled by a single DCI message, in accordance with various aspects of the present disclosure.

As shown by reference number 905, in some aspects, the single DCI message includes a single BWP indicator value within a single BWP indicator field. "BWP indicator value" may refer to a value that indicates or identifies one or more BWPs on which one or more communications are scheduled. "BWP indicator field" may refer to a field, in the single DCI message, that includes the BWP indicator value, such as a dedicated field of the single DCI message that includes the BWP indicator value. The example single DCI message of FIG. 9 includes a single field dedicated to carrying bits of the BWP indicator value. By using a single BWP indicator field and a single BWP indicator value, signaling overhead may be reduced and network resources may be conserved.

In example 900, the single BWP indicator value represents a single value that is used to identify multiple BWPs for the multiple cells. For example, the single BWP indicator value (shown as 0) may represent a single value (e.g., also 0) that identifies respective BWPs for each cell on which the single DCI message schedules a communication. As shown by reference number 910, the single value of 0 indicates a first BWP (having a BWP ID of 1) on a first cell (Cell 0) and indicates a second BWP (having a BWP ID of 3) on a second cell (Cell 1). In some aspects, the same BWP ID may be used in different cells, but may represent different BWPs in those cells. Thus, the BWP IDs corresponding to the BWP indicator value (and the single value) may be the same in different cells or may be different in different cells.

The example BWP indicator value of 0 in example 900 may indicate an initial BWP in an ordered set of BWPs for the first cell (e.g., the first BWP in the ordered set), and may also indicate an initial BWP in an ordered set of BWPs for the second cell (e.g., the first BWP in the ordered set). For example, if the ordered set of BWPs for the first cell includes a BWP having an ID of 1 and a BWP having an ID of 2, then the BWP indicator value of 0 may indicate the BWP having the ID of 1 (e.g., assuming the ordered set of BWPs is ordered from smallest or lowest BWP ID to largest or highest BWP ID). Similarly, if the ordered set of BWPs for the second cell includes a BWP having an ID of 3 and a BWP having an ID of 4, then the BWP indicator value of 0 may indicate the BWP having the ID of 3. In some aspects, the base station 110 may transmit, to the UE 120, a configuration (e.g., in an RRC message) that indicates the ordered set of BWPs for each cell (e.g., an order of the ordered set). In some aspects, the ordered set of BWPs for each cell (e.g., an order of the ordered set) may be specified according to a wireless communication standard.

In some aspects, the UE 120 may have a different number of BWPs configured in different cells. This may lead to misinterpretation of the BWP indicator value. To mitigate this issue, the UE 120 may follow a rule to determine a number of bits (e.g., a bit length, a bit width, or a bit size) included in the BWP indicator field (e.g., a number of bits of the BWP indicator value). The rule may be configured by the base station 110 or may be specified according to a wireless communication standard.

For example, as shown by reference number 915, the base station 110 may transmit, to the UE 120, a configuration (e.g., in an RRC message) that indicates a number of bits to be included in the single BWP indicator field (e.g., a bit length or bit size of the field). For example, the base station 110 may indicate that the BWP indicator field is 1 bit in length or is 2 bits in length, among other examples. Alternatively, the base station 110 may indicate a manner in which the bit length or number of bits is to be determined. In some aspects, the number of bits (e.g., the bit length or bit size) or the manner in which the number of bits is to be determined may be specified in a wireless communication standard.

In some aspects, the number of bits included in the BWP indicator field of the single DCI message may be based at least in part on a number of BWPs configured for a cell (e.g., for any cell) on which a communication is scheduled by the single DCI message. In some aspects, all cells scheduled by the single DCI message may be required to be configured with a same number of BWPs (e.g., a same number of UE-specific RRC configured downlink BWPs for single DCI scheduling downlink communications, or a same number of UE-specific RRC configured uplink BWPs for single DCI scheduling uplink communications). For example, if all of the multiple cells scheduled by the single DCI message have two configured BWPs, then the BWP indicator field may contain one bit. As another example, if all of the multiple cells scheduled by the single DCI message have three configured BWPs or if all of the multiple cells scheduled by the single DCI message have four configured BWPs, then the BWP indicator field may contain two bits. This reduces the likelihood of ambiguity when scheduling communications on multiple cells.

In some aspects, the number of bits included in the BWP indicator field of the single DCI message may be based at least in part on a maximum number of BWPs permitted to be configured for a cell. For example, if a maximum of four BWPs are permitted to be configured per cell (e.g., if a cell is not permitted to be configured with more than four BWPs), then the BWP indicator field may contain two bits.

In some aspects, the number of bits included in the BWP indicator field of the single DCI message may be based at least in part on a smallest number of BWPs configured for a cell, of multiple cells scheduled by the single DCI message, as compared to all other cells of the multiple cells. For example, if a first cell scheduled by the single DCI message has three configured BWPs, and a second cell scheduled by the single DCI message has two configured BWPs, then the BWP indicator field may contain one bit (e.g., to indicate two possible values, one for each of the two configured BWPs of the second cell). This may reduce signaling overhead.

In some aspects, the number of bits included in the BWP indicator field of the single DCI message may be based at least in part on a largest number of BWPs configured for a cell, of multiple cells scheduled by the single DCI message, as compared to all other cells of the multiple cells. For example, if a first cell scheduled by the single DCI message has three configured BWPs, and a second cell scheduled by the single DCI message has two configured BWPs, then the BWP indicator field may contain two bits (e.g., to enable an indication of each of the three configured BWPs of the first cell). This may increase scheduling flexibility.

In some aspects, the number of bits included in the BWP indicator field of the single DCI message may be based at least in part on a number of BWPs configured for a specific cell. The specific cell may or may not be included in the multiple cells scheduled by the single DCI message. In some aspects, the specific cell may be a cell via which the single DCI message is received (e.g., a scheduling cell). In some aspects, the specific cell may be a cell, of multiple cells scheduled by the single DCI message, that has a smallest cell identifier or a smallest sub-carrier spacing (SCS) among all cells of the multiple cells (or that has a smallest cell identifier or a smallest SCS among a set of cells that includes the multiple cells and that includes the scheduling cell). In some aspects, the specific cell may be a cell, of multiple cells scheduled by the single DCI message, that has a largest cell identifier or a largest SCS among all cells of the multiple cells (or that has a largest cell identifier or a largest SCS among a set of cells that includes the multiple cells and that includes the scheduling cell).

In some aspects, the single BWP indicator value included in the single DCI message may correspond to a BWP number (e.g., in an ordered set of BWPs) that is greater than a number of BWPs configured for a cell of the multiple cells scheduled by the single DCI message. For example, if a first cell scheduled by the single DCI message has four configured BWPs, and a second cell scheduled by the single DCI message has two configured BWPs, then the BWP indicator field may contain two bits to enable an indication of each of the four configured BWPs of the first cell (e.g., using four possible values of 00, 01, 10, and 11). However, the second cell does not have four configured BWPs to correspond to each of the possible values in the BWP indicator field.

In some aspects, when the single BWP indicator value corresponds to a BWP number (e.g., in an ordered set of BWPs) that is greater than a number of BWPs configured for a cell, then the UE 120 and/or the base station 110 may refrain from scheduling a communication on that cell (e.g., may refrain from transmitting or receiving a scheduled communication on that cell). However, in this case, the UE 120 and/or the base station 110 may schedule a communication in a cell for which the BWP indicator value is valid. Alternatively, when the single BWP indicator value corresponds to a BWP number that is greater than a number of BWPs configured for a cell, then the UE 120 and/or the base station 110 may schedule a communication on that cell in a current active BWP of that cell (e.g., may transmit or receive the scheduled communication in a current active BWP without performing BWP switching).

Alternatively, when the single BWP indicator value corresponds to a BWP number that is greater than a number of BWPs configured for a cell, then the UE 120 and/or the base station 110 may schedule a communication on that cell (e.g., may transmit or receive a scheduled communication on that cell) in a BWP determined based at least in part on performing a modulo operation using the BWP indicator value and a number of BWPs configured for that cell. For example, if the BWP indicator value is 3 and the number of BWPs configured for the cell is 2, then the UE 120 and/or the base station 110 may calculate 3 mod 2=1. The UE 120 and/or the base station 110 may interpret the BWP indicator value of 3 as a value of 1, and may identify a BWP of the cell corresponding to the value of 1 (e.g., a second BWP in an ordered set of BWPs). As another example, if the BWP indicator value is 2 and the number of BWPs configured for the cell is 2, then the UE 120 and/or the base station 110 may calculate 2 mod 2=0. The UE 120 and/or the base station 110 may interpret the BWP indicator value of 2 as a value of 0, and may identify a BWP of the cell corresponding to the value of 0 (e.g., a first BWP in an ordered set of BWPs).

Alternatively, when the single BWP indicator value corresponds to a BWP number that is greater than a number of BWPs configured for a cell, then the UE 120 and/or the base station 110 may schedule the communication (e.g., may transmit or receive a scheduled communication) in a specific BWP of that cell. The specific BWP may be, for example, a BWP with a smallest BWP identifier among the number of BWPs configured for the cell or a BWP with a largest BWP identifier among the number of BWPs configured for the cell, among other examples. Additionally, or alternatively, the specific BWP may be, for example, a BWP that is first in an ordered set of BWPs that includes the number of BWPs configured for the cell or a BWP that is last in an ordered set of BWPs that includes the number of BWPs configured for the cell, among other examples.

As indicated above, FIG. 9 is provided as an example. Other examples may differ from what is described with respect to FIG. 9.

Figure 10:
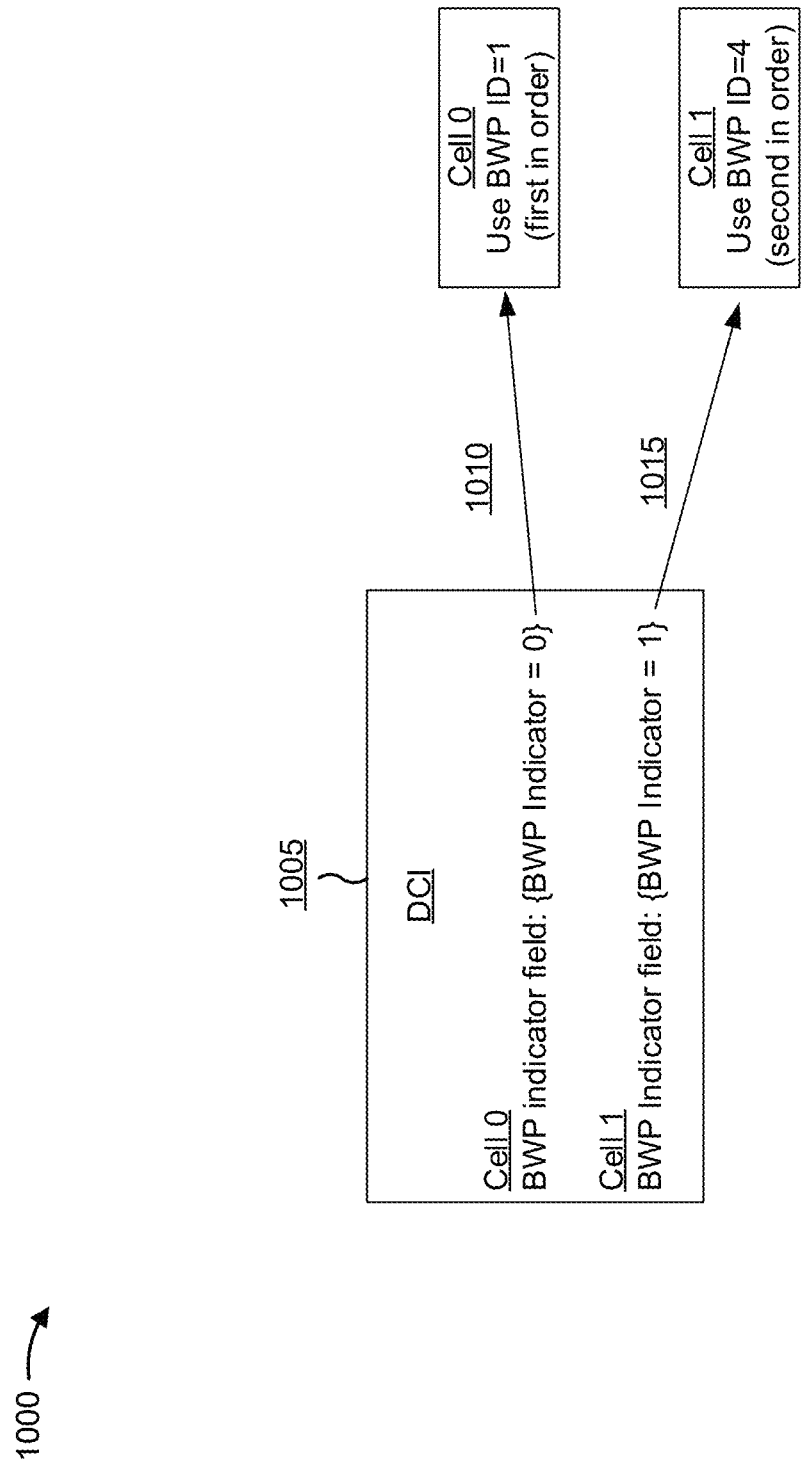

FIG. 10 is a diagram illustrating an example 1000 of BWP indication for multiple cells scheduled by a single DCI message, in accordance with various aspects of the present disclosure.

As shown by reference number 1005, in some aspects, the single DCI message includes multiple BWP indicator values in corresponding multiple BWP indicator fields. In this case, each BWP indicator value may correspond to a different cell of multiple cells scheduled by the single DCI message. The example single DCI message of FIG. 10 includes multiple fields (e.g., two fields) dedicated to carrying bits of respective BWP indicator values. By using multiple BWP indicator fields and corresponding multiple BWP indicator values, scheduling flexibility may be increased.

In example 1000, a first BWP indicator value, in a first BWP indicator field associated with a first cell (Cell 0), has a value of 0. As shown by reference number 1010, the first BWP indicator value of 0 indicates a first BWP (having a BWP ID of 1) on the first cell (Cell 0), which may be a first BWP in an ordered set of BWPs for the first cell. As further shown, a second BWP indicator value, in a second BWP indicator field associated with a second cell (Cell 1), has a value of 1. As shown by reference number 1015, the second BWP indicator value of 1 indicates a second BWP (having a BWP ID of 4) on the second cell (Cell 1), which may be a second BWP in an ordered set of BWPs for the second cell. In some aspects, the same BWP ID may be used in different cells, but may represent different BWPs in those cells. Thus, the BWP IDs corresponding to the BWP indicator value (and the single value) may be the same in different cells or may be different in different cells. In some aspects, a number of bits included in a BWP indicator field for a cell may be based at least in part on the number of BWPs configured for that cell (e.g., 0 bits for one configured BWP, 1 bit for two configured BWPs, or 2 bits for three or four configured BWPs, among other examples).

In some aspects, the size of the single DCI message may be limited. In this case, the single DCI message may include multiple BWP indicator values, in corresponding multiple BWP indicator fields, only if a number of cells scheduled by the single DCI message is less than or equal to a threshold (e.g., two or three, among other examples). In this way, the size limit of the single DCI message may be satisfied.

As indicated above, FIG. 10 is provided as an example. Other examples may differ from what is described with respect to FIG. 10.

Figure 11:
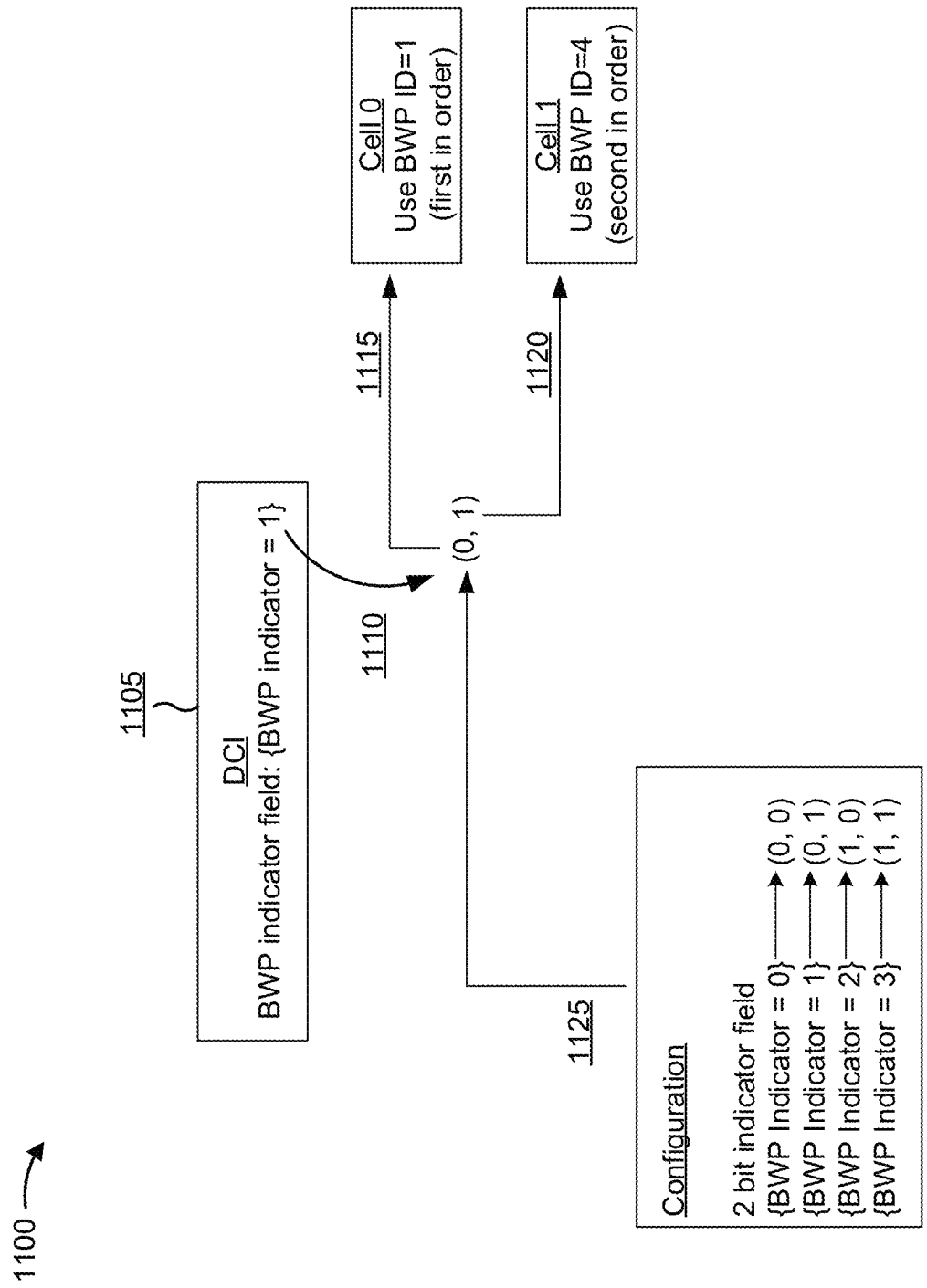

FIG. 11 is a diagram illustrating an example 1100 of BWP indication for multiple cells scheduled by a single DCI message, in accordance with various aspects of the present disclosure.

As shown by reference number 1105, in some aspects, the single DCI message may include a single BWP indicator value within a single BWP indicator field, which may conserve signaling overhead and may conserve network resources. In example 1100, the single BWP indicator value represents multiple values and each of the multiple values is used to identify a respective BWP for a corresponding cell. For example, as shown by reference number 1110, the single BWP indicator value (shown as 1) may represent a first value (e.g., 0) that identifies a first BWP for a first scheduled cell and may also represent a second value (e.g., 1) that identifies a second BWP for a second scheduled cell. As shown by reference number 1115, the first value of 0 indicates a first BWP (having a BWP ID of 1) on a first cell (Cell 0), which may be a first BWP in an ordered set of BWPs for the first cell. As shown by reference number 1120, the second value of 1 may indicates a second BWP (having a BWP ID of 4) on a second cell (Cell 1), which may be a second BWP in an ordered set of BWPs for the second cell.

As shown by reference number 1125, the base station 110 may transmit, to the UE 120, a configuration (e.g., in an RRC message) that indicates a number of bits to be included in the single BWP indicator field (e.g., a bit length or bit size of the field). For example, the base station 110 may indicate that the BWP indicator field is 1 bit in length, is 2 bits in length, or is 3 bits in length, among other examples. Additionally, or alternatively, the base station 110 may configure a mapping between bit values (e.g., BWP indicator values) and corresponding sets of multiple values used to identify the multiple BWPs. In example 1100, the base station 110 indicates that a BWP indicator value of 0 corresponds to a first value (for the first cell) of 0 and a second value (for the second cell) of 0, a BWP indicator value of 1 corresponds to a first value of 0 and a second value of 1, a BWP indicator value of 2 corresponds to a first value of 1 and a second value of 0, and a BWP indicator value of 3 corresponds to a first value of 1 and a second value of 1. This may enable increased scheduling flexibility while also reducing signaling overhead.

As indicated above, FIG. 11 is provided as an example. Other examples may differ from what is described with respect to FIG. 11.

Figure 12:
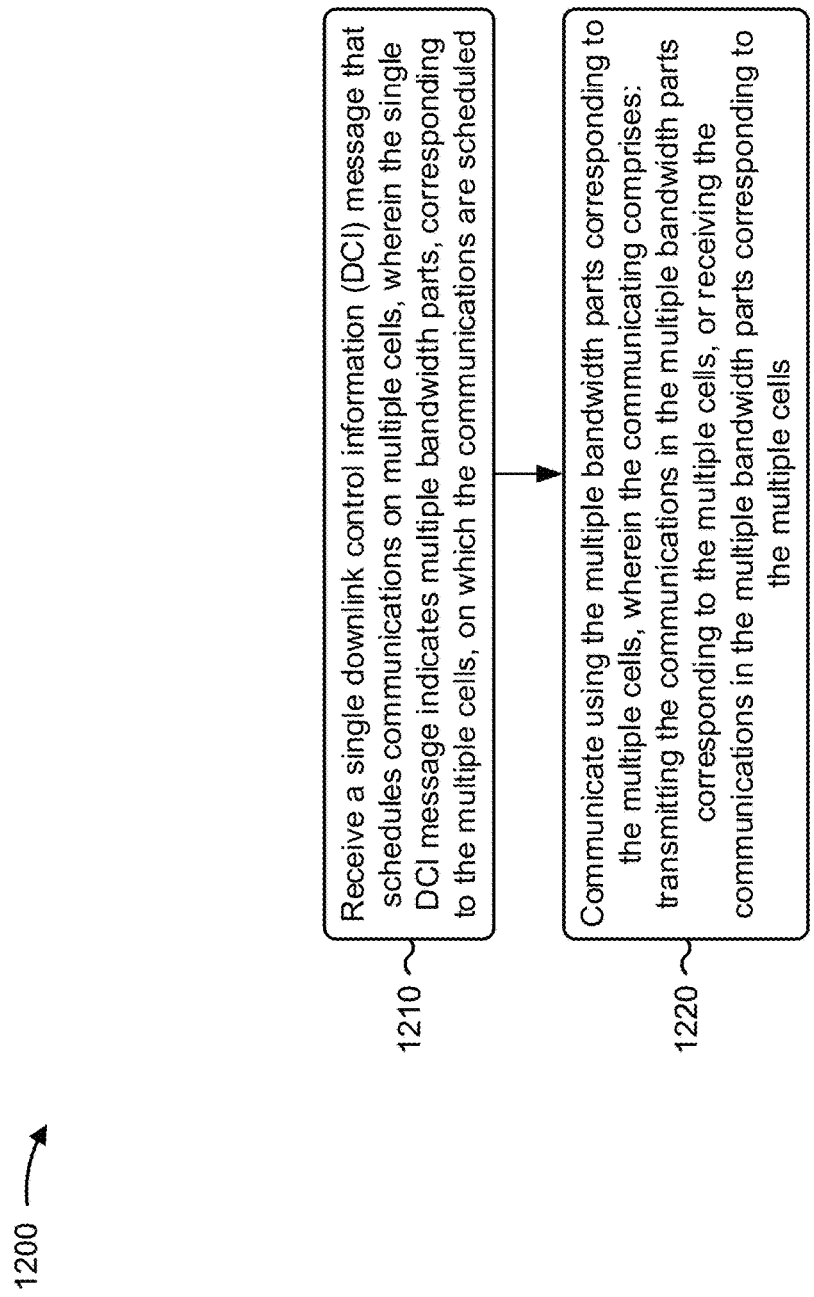
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 and/or the like) performs operations associated with BWP indication for multiple cells scheduled by a single DCI message.

As shown in FIG. 12, in some aspects, process 1200 may include receiving a single DCI message that schedules communications on multiple cells, wherein the single DCI message indicates multiple bandwidth parts, corresponding to the multiple cells, on which the communications are scheduled (block 1210). For example, the UE (e.g., using receive processor 258, controller/processor 280, memory 282, and/or the like) may receive a single DCI message that schedules communications on multiple cells, as described above. In some aspects, the single DCI message indicates multiple bandwidth parts, corresponding to the multiple cells, on which the communications are scheduled.

As further shown in FIG. 12, in some aspects, process 1200 may include communicating using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells (block 1220). For example, the UE (e.g., using receive processor 258, transmit processor 264, controller/processor 280, memory 282, and/or the like) may communicate using the multiple bandwidth parts corresponding to the multiple cells, as described above. In some aspects, the communicating comprises transmitting the communications in the multiple bandwidth parts corresponding to the multiple cells. In some aspects, the communicating comprises receiving the communications in the multiple bandwidth parts corresponding to the multiple cells.

Process 1200 may include additional aspects, such as any single aspect or any combination of aspects described below and/or in connection with one or more other processes described elsewhere herein.

In a first aspect, the communications are downlink communications, the multiple bandwidth parts are multiple downlink bandwidth parts, and the communicating comprises receiving the downlink communications in the multiple downlink bandwidth parts corresponding to the multiple cells.

In a second aspect, alone or in combination with the first aspect, the communications are uplink communications, the multiple bandwidth parts are multiple uplink bandwidth parts, and the communicating comprises transmitting the uplink communications in the multiple uplink bandwidth parts corresponding to the multiple cells.

In a third aspect, alone or in combination with one or more of the first and second aspects, the single DCI message includes a single bandwidth part indicator value within a single bandwidth part indicator field, the single bandwidth part indicator value represents a single value that is used to identify the multiple bandwidth parts for all of the multiple cells.

In a fourth aspect, alone or in combination with one or more of the first through third aspects, the single bandwidth part indicator value indicates a first bandwidth part on a first cell, of the multiple cells, and a second bandwidth part on a second cell of the multiple cells.

In a fifth aspect, alone or in combination with one or more of the first through fourth aspects, a number of bits included in the single bandwidth part indicator field is based at least in part on a number of bandwidth parts configured for a cell of the multiple cells, all cells of the multiple cells are configured with a same number of bandwidth parts.

In a sixth aspect, alone or in combination with one or more of the first through fifth aspects, a number of bits included in the single bandwidth part indicator field is based at least in part on a maximum number of bandwidth parts permitted to be configured for a cell of the multiple cells.

In a seventh aspect, alone or in combination with one or more of the first through sixth aspects, a number of bits included in the single bandwidth part indicator field is based at least in part on a smallest number of bandwidth parts configured for a cell, of the multiple cells, as compared to all other cells of the multiple cells.

In an eighth aspect, alone or in combination with one or more of the first through seventh aspects, a number of bits included in the single bandwidth part indicator field is based at least in part on a largest number of bandwidth parts configured for a cell, of the multiple cells, as compared to all other cells of the multiple cells.

In a ninth aspect, alone or in combination with one or more of the first through eighth aspects, a number of bits included in the single bandwidth part indicator field is based at least in part on a number of bandwidth parts configured for a specific cell.

In a tenth aspect, alone or in combination with one or more of the first through ninth aspects, the specific cell is: a cell on which the single DCI message is received; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In an eleventh aspect, alone or in combination with one or more of the first through tenth aspects, the single bandwidth part indicator value corresponds to a bandwidth part number that is greater than a number of bandwidth parts configured for a cell of the multiple cells.

In a twelfth aspect, alone or in combination with one or more of the first through eleventh aspects, the UE is configured to refrain from scheduling a communication, of the scheduled communications, in the cell based at least in part on a determination that the single bandwidth part indicator value corresponds to a bandwidth part number that is greater than the number of bandwidth parts configured for the cell.

In a thirteenth aspect, alone or in combination with one or more of the first through twelfth aspects, the UE is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In a fourteenth aspect, alone or in combination with one or more of the first through thirteenth aspects, the UE is configured to schedule a communication, of the scheduled communications, in a bandwidth part of the cell based at least in part on a determination that the single bandwidth part indicator value corresponds to a bandwidth part number that is greater than the number of bandwidth parts configured for the cell, the bandwidth part is determined based at least in part on performing a modulo operation using the single bandwidth part indicator value and the number of bandwidth parts configured for the cell.

In a fifteenth aspect, alone or in combination with one or more of the first through fourteenth aspects, the UE is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In a sixteenth aspect, alone or in combination with one or more of the first through fifteenth aspects, the specific bandwidth part is a bandwidth part with a smallest identifier among the number of bandwidth parts configured for the cell or a bandwidth part with a largest identifier among the number of bandwidth parts configured for the cell.

In a seventeenth aspect, alone or in combination with one or more of the first through sixteenth aspects, the single DCI message includes multiple bandwidth part indicator values in corresponding multiple bandwidth part indicator fields, each bandwidth part indicator value corresponds to a different cell of the multiple cells.

In an eighteenth aspect, alone or in combination with one or more of the first through seventeenth aspects, a number of cells, included in the multiple cells, is less than or equal to a threshold.

In a nineteenth aspect, alone or in combination with one or more of the first through eighteenth aspects, the single DCI message includes a single bandwidth part indicator value within a single bandwidth part indicator field, the single bandwidth part indicator value represents multiple values and each of the multiple values is used to identify a respective bandwidth part of the multiple bandwidth parts.

In a twentieth aspect, alone or in combination with one or more of the first through nineteenth aspects, process 1200 includes receiving a configuration that indicates at least one of: a number of bits included in the single bandwidth part indicator field, a mapping between a set of single bandwidth part indicator values and a corresponding set of multiple values used to identify the multiple bandwidth parts, or a combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
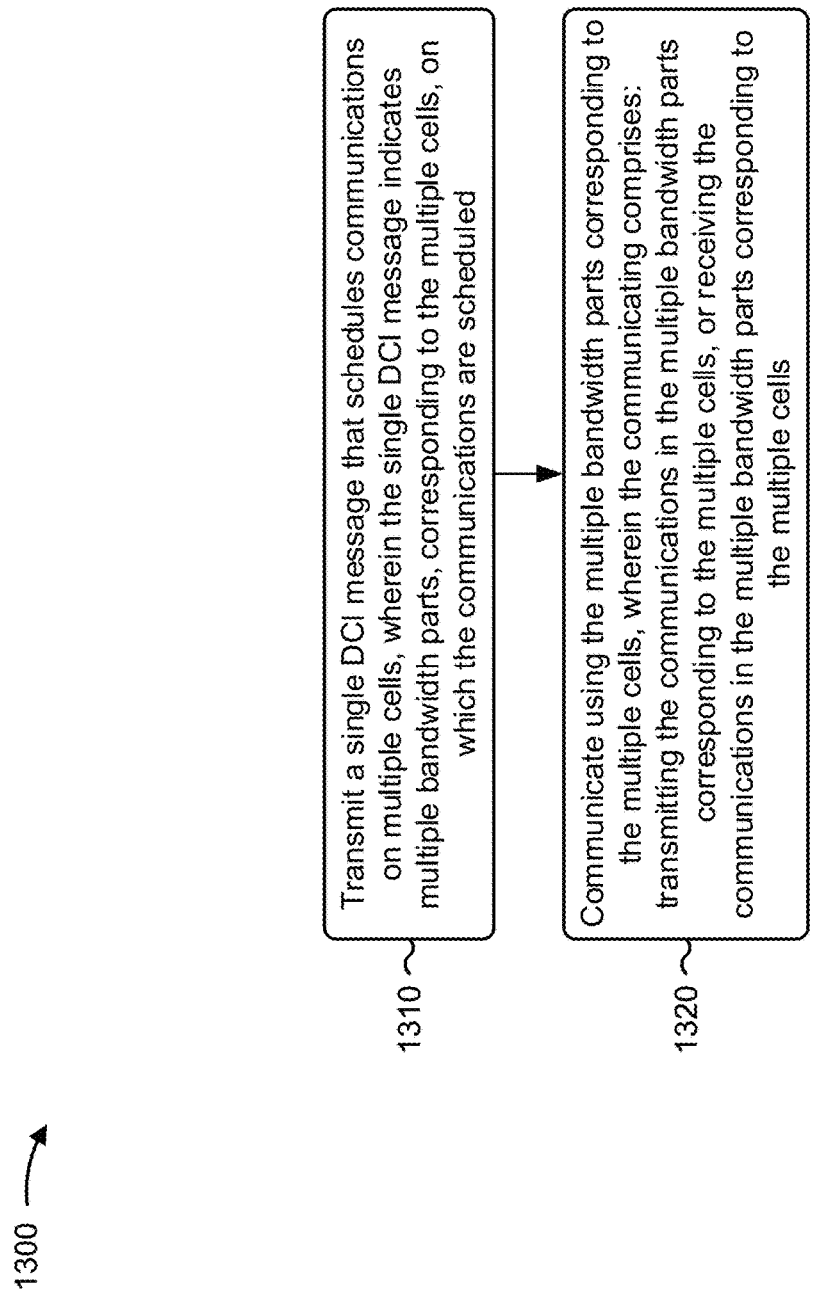
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., base station 110 and/or the like) performs operations associated with BWP indication for multiple cells scheduled by a single DCI message.

As shown in FIG. 13, in some aspects, process 1300 may include transmitting a single DCI message that schedules communications on multiple cells, wherein the single DCI message indicates multiple bandwidth parts, corresponding to the multiple cells, on which the communications are scheduled (block 1310). For example, the base station (e.g., using transmit processor 220, controller/processor 240, memory 242, and/or the like) may transmit a single downlink control information (DCI) message that schedules communications on multiple cells, as described above. In some aspects, the single DCI message indicates multiple bandwidth parts, corresponding to the multiple cells, on which the communications are scheduled.

As further shown in FIG. 13, in some aspects, process 1300 may include communicating using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells (block 1320). For example, the base station (e.g., using transmit processor 220, receive processor 238, controller/processor 240, memory 242, and/or the like) may communicate using the multiple bandwidth parts corresponding to the multiple cells, as described above. In some aspects, the communicating comprises transmitting the communications in the multiple bandwidth parts corresponding to the multiple cells. In some aspects, the communicating comprises receiving the communications in the multiple bandwidth parts corresponding to the multiple cells.

Process 1300 may include additional aspects, such as any single aspect or any combination of aspects described below and/or in connection with one or more other processes described elsewhere herein.

In a first aspect, the communications are downlink communications, the multiple bandwidth parts are multiple downlink bandwidth parts, and the communicating comprises transmitting the downlink communications in the multiple downlink bandwidth parts corresponding to the multiple cells.

In a second aspect, alone or in combination with the first aspect, the communications are uplink communications, the multiple bandwidth parts are multiple uplink bandwidth parts, and the communicating comprises receiving the uplink communications in the multiple uplink bandwidth parts corresponding to the multiple cells.

In a third aspect, alone or in combination with one or more of the first and second aspects, the single DCI message includes a single bandwidth part indicator value within a single bandwidth part indicator field, the single bandwidth part indicator value represents a single value that is used to identify the multiple bandwidth parts for all of the multiple cells.

In a fourth aspect, alone or in combination with one or more of the first through third aspects, the single bandwidth part indicator value indicates a first bandwidth part on a first cell, of the multiple cells, and a second bandwidth part on a second cell of the multiple cells.

In a fifth aspect, alone or in combination with one or more of the first through fourth aspects, a number of bits included in the single bandwidth part indicator field is based at least in part on a number of bandwidth parts configured for a cell of the multiple cells, all cells of the multiple cells are configured with a same number of bandwidth parts.

In a sixth aspect, alone or in combination with one or more of the first through fifth aspects, a number of bits included in the single bandwidth part indicator field is based at least in part on a maximum number of bandwidth parts permitted to be configured for a cell of the multiple cells.

In a seventh aspect, alone or in combination with one or more of the first through sixth aspects, a number of bits included in the single bandwidth part indicator field is based at least in part on a smallest number of bandwidth parts configured for a cell, of the multiple cells, as compared to all other cells of the multiple cells.

In an eighth aspect, alone or in combination with one or more of the first through seventh aspects, a number of bits included in the single bandwidth part indicator field is based at least in part on a largest number of bandwidth parts configured for a cell, of the multiple cells, as compared to all other cells of the multiple cells.

In a ninth aspect, alone or in combination with one or more of the first through eighth aspects, a number of bits included in the single bandwidth part indicator field is based at least in part on a number of bandwidth parts configured for a specific cell.

In a tenth aspect, alone or in combination with one or more of the first through ninth aspects, the specific cell is: a cell on which the single DCI message is transmitted; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In an eleventh aspect, alone or in combination with one or more of the first through tenth aspects, the single bandwidth part indicator value corresponds to a bandwidth part number that is greater than a number of bandwidth parts configured for a cell of the multiple cells.

In a twelfth aspect, alone or in combination with one or more of the first through eleventh aspects, the base station is configured to refrain from scheduling a communication, of the scheduled communications, in the cell based at least in part on a determination that the single bandwidth part indicator value corresponds to a bandwidth part number that is greater than the number of bandwidth parts configured for the cell.

In a thirteenth aspect, alone or in combination with one or more of the first through twelfth aspects, the base station is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

In a fourteenth aspect, alone or in combination with one or more of the first through thirteenth aspects, the base station is configured to schedule a communication, of the scheduled communications, in a bandwidth part of the cell based at least in part on a determination that the single bandwidth part indicator value corresponds to a bandwidth part number that is greater than the number of bandwidth parts configured for the cell, the bandwidth part is determined based at least in part on performing a modulo operation using the single bandwidth part indicator value and the number of bandwidth parts configured for the cell.

In a fifteenth aspect, alone or in combination with one or more of the first through fourteenth aspects, the base station is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

In a sixteenth aspect, alone or in combination with one or more of the first through fifteenth aspects, the specific bandwidth part is a bandwidth part with a smallest identifier among the number of bandwidth parts configured for the cell or a bandwidth part with a largest identifier among the number of bandwidth parts configured for the cell.

In a seventeenth aspect, alone or in combination with one or more of the first through sixteenth aspects, the single DCI message includes multiple bandwidth part indicator values in corresponding multiple bandwidth part indicator fields, each bandwidth part indicator value corresponds to a different cell of the multiple cells.

In an eighteenth aspect, alone or in combination with one or more of the first through seventeenth aspects, a number of cells, included in the multiple cells, is less than or equal to a threshold.

In a nineteenth aspect, alone or in combination with one or more of the first through eighteenth aspects, the single DCI message includes a single bandwidth part indicator value within a single bandwidth part indicator field, the single bandwidth part indicator value represents multiple values and each of the multiple values is used to identify a respective bandwidth part of the multiple bandwidth parts.

In a twentieth aspect, alone or in combination with one or more of the first through nineteenth aspects, process 1300 includes transmitting a configuration that indicates at least one of: a number of bits is including in the single bandwidth part indicator field, a mapping between a set of single bandwidth part indicator is valuing and a corresponding set of multiple values used to identify the multiple bandwidth parts, or a combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The following provides an overview of aspects of the present disclosure:

Aspect 1: A method of wireless communication performed by a user equipment (UE), comprising: receiving a single downlink control information (DCI) message that schedules communications on multiple cells, wherein the single DCI message indicates multiple bandwidth parts, corresponding to the multiple cells, on which the communications are scheduled; and communicating using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

Aspect 2: The method of aspect 1, wherein the communications are downlink communications, the multiple bandwidth parts are multiple downlink bandwidth parts, and the communicating comprises receiving the downlink communications in the multiple downlink bandwidth parts corresponding to the multiple cells.

Aspect 3: The method of aspect 1, wherein the communications are uplink communications, the multiple bandwidth parts are multiple uplink bandwidth parts, and the communicating comprises transmitting the uplink communications in the multiple uplink bandwidth parts corresponding to the multiple cells.

Aspect 4: The method of any one of the preceding aspects, wherein the single DCI message includes a single bandwidth part indicator value within a single bandwidth part indicator field, wherein the single bandwidth part indicator value represents a single value that is used to identify the multiple bandwidth parts for all of the multiple cells.

Aspect 5: The method of aspect 4, wherein the single bandwidth part indicator value indicates a first bandwidth part on a first cell, of the multiple cells, and a second bandwidth part on a second cell of the multiple cells.

Aspect 6: The method of any one of aspects 4-5, wherein a number of bits included in the single bandwidth part indicator field is based at least in part on a number of bandwidth parts configured for a cell of the multiple cells, wherein all cells of the multiple cells are configured with a same number of bandwidth parts.

Aspect 7: The method of any one of aspects 4-5, wherein a number of bits included in the single bandwidth part indicator field is based at least in part on a maximum number of bandwidth parts permitted to be configured for a cell of the multiple cells.

Aspect 8: The method of any one of aspects 4-5, wherein a number of bits included in the single bandwidth part indicator field is based at least in part on a smallest number of bandwidth parts configured for a cell, of the multiple cells, as compared to all other cells of the multiple cells.

Aspect 9: The method of any one of aspects 4-5, wherein a number of bits included in the single bandwidth part indicator field is based at least in part on a largest number of bandwidth parts configured for a cell, of the multiple cells, as compared to all other cells of the multiple cells.

Aspect 10: The method of any one of aspects 4-5, wherein a number of bits included in the single bandwidth part indicator field is based at least in part on a number of bandwidth parts configured for a specific cell.

Aspect 11: The method of aspect 10, wherein the specific cell is: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 12: The method of aspect 4, wherein the single bandwidth part indicator value corresponds to a bandwidth part number that is greater than a number of bandwidth parts configured for a cell of the multiple cells.

Aspect 13: The method of aspect 12, wherein the UE is configured to refrain from scheduling a communication, of the scheduled communications, in the cell based at least in part on a determination that the single bandwidth part indicator value corresponds to a bandwidth part number that is greater than the number of bandwidth parts configured for the cell.

Aspect 14: The method of any one of aspects 12-13, wherein the UE is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

Aspect 15: The method of any one of aspects 12-13, wherein the UE is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

Aspect 16: The method of any one of aspects 12-13, wherein the UE is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

Aspect 17: The method of aspect 16, wherein the specific bandwidth part is a bandwidth part with a smallest identifier among the number of bandwidth parts configured for the cell or a bandwidth part with a largest identifier among the number of bandwidth parts configured for the cell.

Aspect 18: The method of aspect 1, wherein the single DCI message includes multiple bandwidth part indicator values in corresponding multiple bandwidth part indicator fields, wherein each bandwidth part indicator value corresponds to a different cell of the multiple cells.

Aspect 19: The method of aspect 18, wherein a number of cells, included in the multiple cells, is less than or equal to a threshold.

Aspect 20: The method of aspect 1, wherein the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

Aspect 21: The method of aspect 20, further comprising receiving a configuration that indicates at least one of: a number of bits included in the single bandwidth part indicator field, a mapping between a set of single bandwidth part indicator values and a corresponding set of multiple values used to identify the multiple bandwidth parts, or a combination thereof.

Aspect 22: A method of wireless communication performed by a base station, comprising: transmitting a single downlink control information (DCI) message that schedules communications on multiple cells, wherein the single DCI message indicates multiple bandwidth parts, corresponding to the multiple cells, on which the communications are scheduled; and communicating using the multiple bandwidth parts corresponding to the multiple cells, wherein the communicating comprises: transmitting the communications in the multiple bandwidth parts corresponding to the multiple cells, or receiving the communications in the multiple bandwidth parts corresponding to the multiple cells.

Aspect 23: The method of aspect 22, wherein the communications are downlink communications, the multiple bandwidth parts are multiple downlink bandwidth parts, and the communicating comprises transmitting the downlink communications in the multiple downlink bandwidth parts corresponding to the multiple cells.

Aspect 24: The method of aspect 22, wherein the communications are uplink communications, the multiple bandwidth parts are multiple uplink bandwidth parts, and the communicating comprises receiving the uplink communications in the multiple uplink bandwidth parts corresponding to the multiple cells.

Aspect 25: The method of aspect 22, wherein the single DCI message includes a single bandwidth part indicator value within a single bandwidth part indicator field, wherein the single bandwidth part indicator value represents a single value that is used to identify the multiple bandwidth parts for all of the multiple cells.

Aspect 26: The method of aspect 25, wherein the single bandwidth part indicator value indicates a first bandwidth part on a first cell, of the multiple cells, and a second bandwidth part on a second cell of the multiple cells.

Aspect 27: The method of any one of aspects 25-26, wherein a number of bits included in the single bandwidth part indicator field is based at least in part on a number of bandwidth parts configured for a cell of the multiple cells, wherein all cells of the multiple cells are configured with a same number of bandwidth parts.

Aspect 28: The method of any one of aspects 25-26, wherein a number of bits included in the single bandwidth part indicator field is based at least in part on a maximum number of bandwidth parts permitted to be configured for a cell of the multiple cells.

Aspect 29: The method of any one of aspects 25-26, wherein a number of bits included in the single bandwidth part indicator field is based at least in part on a smallest number of bandwidth parts configured for a cell, of the multiple cells, as compared to all other cells of the multiple cells.

Aspect 30: The method of any one of aspects 25-26, wherein a number of bits included in the single bandwidth part indicator field is based at least in part on a largest number of bandwidth parts configured for a cell, of the multiple cells, as compared to all other cells of the multiple cells.

Aspect 31: The method of any one of aspects 25-26, wherein a number of bits included in the single bandwidth part indicator field is based at least in part on a number of bandwidth parts configured for a specific cell.

Aspect 32: The method of aspect 31, wherein the specific cell is: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 33: The method of aspect 25, wherein the single bandwidth part indicator value corresponds to a bandwidth part number that is greater than a number of bandwidth parts configured for a cell of the multiple cells.

Aspect 34: The method of aspect 33, wherein the base station is configured to refrain from scheduling a communication, of the scheduled communications, in the cell based at least in part on a determination that the single bandwidth part indicator value corresponds to a bandwidth part number that is greater than the number of bandwidth parts configured for the cell.

Aspect 35: The method of any one of aspects 33-34, wherein the base station is configured to schedule a communication, of the scheduled communications, in a current active bandwidth part of the cell based at least in part on a determination that the single bandwidth part indicator value corresponds to a bandwidth part number that is greater than the number of bandwidth parts configured for the cell.

Aspect 36: The method of any one of aspects 33-34, wherein the base station is configured to schedule a communication, of the scheduled communications, in a bandwidth part of the cell based at least in part on a determination that the single bandwidth part indicator value corresponds to a bandwidth part number that is greater than the number of bandwidth parts configured for the cell, wherein the bandwidth part is determined based at least in part on performing a modulo operation using the single bandwidth part indicator value and the number of bandwidth parts configured for the cell.

Aspect 37: The method of any one of aspects 33-34, wherein the base station is configured to schedule a communication, of the scheduled communications, in a specific bandwidth part of the cell based at least in part on a determination that the single bandwidth part indicator value corresponds to a bandwidth part number that is greater than the number of bandwidth parts configured for the cell.

Aspect 38: The method of aspect 37, wherein the specific bandwidth part is a bandwidth part with a smallest identifier among the number of bandwidth parts configured for the cell or a bandwidth part with a largest identifier among the number of bandwidth parts configured for the cell.

Aspect 39: The method of aspect 22, wherein the single DCI message includes multiple bandwidth part indicator values in corresponding multiple bandwidth part indicator fields, wherein each bandwidth part indicator value corresponds to a different cell of the multiple cells.

Aspect 40: The method of aspect 39, wherein a number of cells, included in the multiple cells, is less than or equal to a threshold.

Aspect 41: The method of aspect 22, wherein the single DCI message includes a single bandwidth part indicator value within a single bandwidth part indicator field, wherein the single bandwidth part indicator value represents multiple values and each of the multiple values is used to identify a respective bandwidth part of the multiple bandwidth parts.

Aspect 42: The method of aspect 41, further comprising transmitting a configuration that indicates at least one of: a number of bits included in the single bandwidth part indicator field, a mapping between a set of single bandwidth part indicator values and a corresponding set of multiple values used to identify the multiple bandwidth parts, or a combination thereof.

Aspect 43: An apparatus for wireless communication at a device, comprising a processor; memory coupled with the processor; and instructions stored in the memory and executable by the processor to cause the apparatus to perform the method of one or more aspects of aspects 1-21.

Aspect 44: A device for wireless communication, comprising a memory and one or more processors coupled to the memory, the memory and the one or more processors configured to perform the method of one or more aspects of aspects 1-21.

Aspect 45: An apparatus for wireless communication, comprising at least one means for performing the method of one or more aspects of aspects 1-21.

Aspect 46: A non-transitory computer-readable medium storing code for wireless communication, the code comprising instructions executable by a processor to perform the method of one or more aspects of aspects 1-21.

Aspect 47: A non-transitory computer-readable medium storing a set of instructions for wireless communication, the set of instructions comprising one or more instructions that, when executed by one or more processors of a device, cause the device to perform the method of one or more aspects of aspects 1-21.

Aspect 48: An apparatus for wireless communication at a device, comprising a processor; memory coupled with the processor; and instructions stored in the memory and executable by the processor to cause the apparatus to perform the method of one or more aspects of aspects 22-42.

Aspect 49: A device for wireless communication, comprising a memory and one or more processors coupled to the memory, the memory and the one or more processors configured to perform the method of one or more aspects of aspects 22-42.

Aspect 50: An apparatus for wireless communication, comprising at least one means for performing the method of one or more aspects of aspects 22-42.

Aspect 51: A non-transitory computer-readable medium storing code for wireless communication, the code comprising instructions executable by a processor to perform the method of one or more aspects of aspects 22-42.

Aspect 52: A non-transitory computer-readable medium storing a set of instructions for wireless communication, the set of instructions comprising one or more instructions that, when executed by one or more processors of a device, cause the device to perform the method of one or more aspects of aspects 22-42.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors coupled to the memory, wherein the one or more processors are configured to:
      receive a first single downlink control information (DCI) message that schedules communications on multiple cells,
         wherein the first single DCI message includes a single bandwidth part indicator value, within a single bandwidth part indicator field, used to identify multiple bandwidth parts, corresponding to the multiple cells, on which the communications are scheduled, and
         wherein the single bandwidth part indicator value indicates a bandwidth part at a particular position of a first ordered set of bandwidth parts, for a first cell of the multiple cells, and a bandwidth part at the particular position of a second ordered set of bandwidth parts for a second cell of the multiple cells; and
      communicate using the multiple bandwidth parts corresponding to the multiple cells,
         wherein the one or more processors, to communicate using the multiple bandwidth parts corresponding to the multiple cells, are configured to:
            transmit the communications in the multiple bandwidth parts corresponding to the multiple cells, or
            receive the communications in the multiple bandwidth parts corresponding to the multiple cells.

2. The UE of claim 1, wherein the communications are downlink communications, and the multiple bandwidth parts are multiple downlink bandwidth parts; and
   wherein the one or more processors, to communicate using the multiple bandwidth parts corresponding to the multiple cells, are configured to:
      receive the downlink communications in the multiple downlink bandwidth parts corresponding to the multiple cells.

3. The UE of claim 1, wherein the communications are uplink communications, and the multiple bandwidth parts are multiple uplink bandwidth parts; and
   wherein the one or more processors, to communicate using the multiple bandwidth parts corresponding to the multiple cells, are configured to:
      transmit the uplink communications in the multiple uplink bandwidth parts corresponding to the multiple cells.

4. The UE of claim 1, wherein a quantity of bits included in the single bandwidth part indicator field is based at least in part on a quantity of bandwidth parts configured for a cell of the multiple cells, wherein all cells of the multiple cells are configured with a same quantity of bandwidth parts.

5. The UE of claim 1, wherein a quantity of bits included in the single bandwidth part indicator field is based at least in part on a maximum quantity of bandwidth parts permitted to be configured for a cell of the multiple cells.

6. The UE of claim 1, wherein a quantity of bits included in the single bandwidth part indicator field is based at least in part on a smallest quantity of bandwidth parts configured for a cell, of the multiple cells, as compared to all other cells of the multiple cells.

7. The UE of claim 1, wherein a quantity of bits included in the single bandwidth part indicator field is based at least in part on a largest quantity of bandwidth parts configured for a cell, of the multiple cells, as compared to all other cells of the multiple cells.

8. The UE of claim 1, wherein a quantity of bits included in the single bandwidth part indicator field is based at least in part on a quantity of bandwidth parts configured for a specific cell.

9. The UE of claim 8, wherein the specific cell is:
a cell on which the first single DCI message is received,
a cell, of the multiple cells, that has a smallest cell identifier among all cells of the multiple cells,
a cell, of the multiple cells, that has a largest cell identifier among all cells of the multiple cells,
a cell, of the multiple cells, that has a smallest sub-carrier spacing among all cells of the multiple cells, or
a cell, of the multiple cells, that has a largest sub-carrier spacing among all cells of the multiple cells.

10. The UE of claim 1, wherein the single bandwidth part indicator value corresponds to a bandwidth part number that is greater than a quantity of bandwidth parts configured for a cell of the multiple cells.

11. The UE of claim 10, wherein the one or more processors are further configured to:
refrain from scheduling a communication, of the scheduled communications, in the cell based at least in part on a determination that the single bandwidth part indicator value corresponds to a bandwidth part number that is greater than the quantity of bandwidth parts configured for the cell.

12. The UE of claim 10, wherein the one or more processors are further configured to:
schedule a communication, of the scheduled communications, in a current active bandwidth part of the cell based at least in part on a determination that the single bandwidth part indicator value corresponds to a bandwidth part number that is greater than the quantity of bandwidth parts configured for the cell.

13. The UE of claim 10, wherein the one or more processors are further configured to:
schedule a communication, of the scheduled communications, in a bandwidth part of the cell based at least in part on a determination that the single bandwidth part indicator value corresponds to a bandwidth part number that is greater than the quantity of bandwidth parts configured for the cell,
wherein the bandwidth part of the cell is determined based at least in part on a modulo operation using the single bandwidth part indicator value and the quantity of bandwidth parts configured for the cell.

14. The UE of claim 10, wherein the one or more processors are further configured to:
schedule a communication, of the scheduled communications, in a specific bandwidth part of the cell based at least in part on a determination that the single bandwidth part indicator value corresponds to a bandwidth part number that is greater than the quantity of bandwidth parts configured for the cell.

15. The UE of claim 14, wherein the specific bandwidth part is a bandwidth part with a smallest identifier among the quantity of bandwidth parts configured for the cell or a bandwidth part with a largest identifier among the quantity of bandwidth parts configured for the cell.

16. The UE of claim 1, wherein a quantity of cells, included in the multiple cells, is less than or equal to a threshold.

17. The UE of claim 1, wherein the one or more processors are further configured to:
receive a configuration that indicates a quantity of bits included in the single bandwidth part indicator field.

18. The UE of claim 1, wherein the one or more processors are further configured to:
receive a second single DCI message that includes multiple bandwidth part indicator values in corresponding multiple bandwidth part indicator fields, wherein each bandwidth part indicator value, of the multiple bandwidth part indicator values, corresponds to a different cell of the multiple cells.

19. The UE of claim 18, wherein the multiple bandwidth part indicator values include a first bandwidth part indicator value and a second bandwidth part indicator value,
wherein the first bandwidth part indicator value indicates a bandwidth part at a first position of a third ordered set of bandwidth parts for a third cell of the multiple cells, and
wherein the second bandwidth part indicator value indicates a bandwidth part at a second position of a fourth ordered set of bandwidth parts for a fourth cell of the multiple cells.

20. The UE of claim 1, wherein the one or more processors are further configured to:
receive a second single DCI message that includes a single bandwidth part indicator value in a single bandwidth part indicator field,
wherein the single bandwidth part indicator value included in the second DCI message is associated with multiple bits, and
wherein each bit value of the multiple bits corresponds to a different cell of the multiple cells.

21. A network entity for wireless communication, comprising:
a memory; and
one or more processors coupled to the memory, wherein the one or more processors are configured to:
transmit a first single downlink control information (DCI) message that schedules communications on multiple cells,
wherein the first single DCI message includes a single bandwidth part indicator value, within a single bandwidth part indicator field, used to identify multiple bandwidth parts, corresponding to the multiple cells, on which the communications are scheduled, and
wherein the single bandwidth part indicator value indicates a bandwidth part at a particular position of a first ordered set of bandwidth parts, for a first cell of the multiple cells, and a bandwidth part at the particular position of a second ordered set of bandwidth parts for a second cell of the multiple cells, and
wherein N is an integer; and
communicate using the multiple bandwidth parts corresponding to the multiple cells,
wherein the one or more processors, to communicate using the multiple bandwidth parts corresponding to the multiple cells, are configured to:

transmit the communications in the multiple bandwidth parts corresponding to the multiple cells, or receive the communications in the multiple bandwidth parts corresponding to the multiple cells.

22. The network entity of claim 21, wherein the communications are downlink communications, and the multiple bandwidth parts are multiple downlink bandwidth parts; and
wherein the one or more processors, to communicate using the multiple bandwidth parts corresponding to the multiple cells, are configured to:
transmit the downlink communications in the multiple downlink bandwidth parts corresponding to the multiple cells.

23. The network entity of claim 21, wherein the communications are uplink communications, the multiple bandwidth parts are multiple uplink bandwidth parts; and
wherein the one or more processors, to communicate using the multiple bandwidth parts corresponding to the multiple cells, are configured to:
receive the uplink communications in the multiple uplink bandwidth parts corresponding to the multiple cells.

24. The network entity of claim 21, wherein a quantity of bits included in the single bandwidth part indicator field is based at least in part on a quantity of bandwidth parts configured for a cell of the multiple cells, wherein all cells of the multiple cells are configured with a same quantity of bandwidth parts.

25. The network entity of claim 21, wherein a quantity of bits included in the single bandwidth part indicator field is based at least in part on a maximum quantity of bandwidth parts permitted to be configured for a cell of the multiple cells.

26. The network entity of claim 21, wherein a quantity of bits included in the single bandwidth part indicator field is based at least in part on a smallest quantity of bandwidth parts configured for a cell, of the multiple cells, as compared to all other cells of the multiple cells.

27. The network entity of claim 21, wherein a quantity of bits included in the single bandwidth part indicator field is based at least in part on a largest quantity of bandwidth parts configured for a cell, of the multiple cells, as compared to all other cells of the multiple cells.

28. The network entity of claim 21, wherein a quantity of bits included in the single bandwidth part indicator field is based at least in part on a quantity of bandwidth parts configured for a specific cell.

29. The network entity of claim 28, wherein the specific cell is:
a cell on which the first single DCI message is received,
a cell, of the multiple cells, that has a smallest cell identifier among all cells of the multiple cells,
a cell, of the multiple cells, that has a largest cell identifier among all cells of the multiple cells,
a cell, of the multiple cells, that has a smallest sub-carrier spacing among all cells of the multiple cells, or
a cell, of the multiple cells, that has a largest sub-carrier spacing among all cells of the multiple cells.

30. The network entity of claim 21, wherein the single bandwidth part indicator value corresponds to a bandwidth part number that is greater than a quantity of bandwidth parts configured for a cell of the multiple cells.

31. The network entity of claim 21, wherein the one or more processors are further configured to:
transmit a configuration that indicates a quantity of bits included in the single bandwidth part indicator field.

32. A method of wireless communication performed by a user equipment (UE), comprising:
receiving a first single downlink control information (DCI) message that schedules communications on multiple cells,
wherein the first single DCI message includes a single bandwidth part indicator value, within a single bandwidth part indicator field, used to identify multiple bandwidth parts, corresponding to the multiple cells, on which the communications are scheduled, and
wherein the single bandwidth part indicator value indicates a bandwidth part at a particular position of a first ordered set of bandwidth parts, for a first cell of the multiple cells, and a bandwidth part at the particular position of a second ordered set of bandwidth parts for a second cell of the multiple cells; and
communicating using the multiple bandwidth parts corresponding to the multiple cells, wherein the communicating comprises:
transmitting the communications in the multiple bandwidth parts corresponding to the multiple cells, or
receiving the communications in the multiple bandwidth parts corresponding to the multiple cells.

33. A method of wireless communication performed by a network entity, comprising:
transmitting a first single downlink control information (DCI) message that schedules communications on multiple cells,
wherein the first single DCI message includes a single bandwidth part indicator value, within a single bandwidth part indicator field, used to identify multiple bandwidth parts, corresponding to the multiple cells, on which the communications are scheduled, and
wherein the single bandwidth part indicator value indicates a bandwidth part at a particular position of a first ordered set of bandwidth parts, for a first cell of the multiple cells, and a bandwidth part at the particular position of a second ordered set of bandwidth parts for a second cell of the multiple cells; and
communicating using the multiple bandwidth parts corresponding to the multiple cells, wherein the communicating comprises:
transmitting the communications in the multiple bandwidth parts corresponding to the multiple cells, or
receiving the communications in the multiple bandwidth parts corresponding to the multiple cells.

* * * * *